US006737788B2

(12) United States Patent
Moler et al.

(10) Patent No.: US 6,737,788 B2
(45) Date of Patent: May 18, 2004

(54) APPARATUS HAVING A PAIR OF OPPOSING SURFACES DRIVEN BY A PIEZOELECTRIC ACTUATOR

(75) Inventors: Jeff Moler, Sarasota, FL (US); Mark Oudshoorn, Bradenton, FL (US); R. Glenn Akhavein, Bradenton, FL (US); Mark Woozley, Valrico, FL (US); Michael Alexy, Snead Island, FL (US)

(73) Assignee: Viking Technologies, L.C., Sarasota, FL (US)

( * ) Notice: Subject to any disclaimer, the term of this patent is extended or adjusted under 35 U.S.C. 154(b) by 0 days.

(21) Appl. No.: 10/370,990

(22) Filed: Feb. 20, 2003

(65) Prior Publication Data

US 2003/0127948 A1 Jul. 10, 2003

Related U.S. Application Data

(62) Division of application No. 09/771,533, filed on Jan. 29, 2001, now Pat. No. 6,548,938.
(60) Provisional application No. 60/198,056, filed on Apr. 18, 2000, and provisional application No. 60/220,542, filed on Jul. 25, 2000.

(51) Int. Cl.[7] ............................................. H01L 41/08
(52) U.S. Cl. ...................................................... 310/328
(58) Field of Search ................... 310/12, 317, 323.01, 310/328

(56) References Cited

U.S. PATENT DOCUMENTS

| 3,144,802 A | 8/1964 | Faber et al. |
| 3,405,289 A | 10/1968 | Gikow |
| 3,414,779 A | 12/1968 | Bohm |
| 3,421,109 A | 1/1969 | Wiggins et al. |
| 3,446,920 A | 5/1969 | Zuerkr |
| 3,513,309 A | 5/1970 | Hehemann |
| 3,548,314 A | 12/1970 | Mitchell |
| 3,558,936 A | 1/1971 | Horan |
| 3,614,486 A | 10/1971 | Smiley |
| 3,649,857 A | 3/1972 | Knappe |
| 3,666,975 A | 5/1972 | Balamuth |

(List continued on next page.)

FOREIGN PATENT DOCUMENTS

| DE | 4220177 | 7/1994 |
| DE | 19946003 | 5/2000 |
| DE | 19946838 | 10/2000 |

(List continued on next page.)

OTHER PUBLICATIONS

US 5,877,442, 3/1999, Freeland et al. (withdrawn)
Salim R et al: "Kleinste Objekte Im Griff a Grip on Even the Smallest Objects" F&M Feinwerktechnic Mikrotechnic Mikroelektronik, Carl Hanswer GMBH & Co, DE, vol. 104, No. 9, Sep. 1, 1996, pp. 637–640, XP000636588.

(List continued on next page.)

Primary Examiner—Thomas M. Dougherty
(74) Attorney, Agent, or Firm—Young & Basile, P.C.

(57) ABSTRACT

The present invention provides an apparatus having at least one pair of opposing surfaces formed on a support structure for movement relative to one another and an actuator operably engaging the support structure for driving the at least one pair of opposing surfaces relative to one another in response to an electrical activation of the actuator. Preferably, the actuator is a piezoelectric device. The apparatus can be adapted for clamping and/or valving applications.

43 Claims, 10 Drawing Sheets

U.S. PATENT DOCUMENTS

| | | |
|---|---|---|
| 3,731,214 A | 5/1973 | Bers |
| 3,749,946 A | 7/1973 | Von Ruti |
| 3,902,084 A | 8/1975 | May, Jr. |
| 3,902,085 A | 8/1975 | Bizzigotti |
| 4,009,447 A | 2/1977 | Wolf et al. |
| 4,018,124 A | 4/1977 | Rosado |
| 4,044,239 A | 8/1977 | Shimauchi et al. |
| 4,088,052 A | 5/1978 | Hedrick |
| 4,088,916 A | 5/1978 | Weineck et al. |
| 4,112,879 A | 9/1978 | Assenheimer et al. |
| 4,157,802 A | 6/1979 | May, Jr. |
| 4,193,703 A | 3/1980 | Kakmann |
| 4,196,652 A | 4/1980 | Raskin |
| 4,207,791 A | 6/1980 | Murakami |
| 4,208,636 A | 6/1980 | German |
| 4,214,215 A | 7/1980 | Mellen et al. |
| 4,228,680 A | 10/1980 | Engel et al. |
| 4,287,582 A | 9/1981 | Tocquet |
| 4,313,361 A | 2/1982 | Deutsch |
| 4,318,023 A | 3/1982 | O'Neill et al. |
| 4,319,843 A | 3/1982 | Gornall |
| 4,327,623 A | 5/1982 | Mochida et al. |
| 4,336,809 A | 6/1982 | Clark |
| 4,388,908 A | 6/1983 | Babitzka et al. |
| 4,426,907 A | 1/1984 | Scholz |
| 4,426,981 A | 1/1984 | Greiner et al. |
| 4,430,899 A | 2/1984 | Wessel |
| 4,432,228 A | 2/1984 | Kuschmierz et al. |
| 4,434,753 A | 3/1984 | Mukainakano et al. |
| 4,435,666 A | 3/1984 | Fukui et al. |
| 4,460,840 A | 7/1984 | Weiger et al. |
| 4,463,727 A | 8/1984 | Babitzka et al. |
| 4,468,583 A | 8/1984 | Mori |
| 4,479,475 A | 10/1984 | Babitzka |
| 4,570,095 A | 2/1986 | Uchikawa |
| 4,570,096 A | 2/1986 | Hara et al. |
| 4,580,540 A | 4/1986 | Babtzka et al. |
| 4,584,923 A | 4/1986 | Minnick |
| 4,612,440 A | 9/1986 | Brunnee et al. |
| 4,617,952 A | 10/1986 | Fujiwara et al. |
| 4,629,039 A | 12/1986 | Imoto et al. |
| 4,629,926 A | 12/1986 | Siegal |
| 4,647,808 A | 3/1987 | Shibuya |
| 4,660,523 A | 4/1987 | Brauer et al. |
| 4,667,639 A | 5/1987 | Linder et al. |
| 4,675,568 A | 6/1987 | Uchikawa et al. |
| 4,697,118 A | 9/1987 | Harnden, Jr. et al. |
| 4,703,215 A | 10/1987 | Asano |
| 4,714,855 A | 12/1987 | Fujimoto |
| 4,725,002 A | 2/1988 | Trachte |
| 4,732,071 A | 3/1988 | Deutsch |
| 4,735,185 A | 4/1988 | Imoto et al. |
| 4,736,131 A | 4/1988 | Fujimoto |
| 4,749,897 A | 6/1988 | Natsume et al. |
| 4,750,706 A | 6/1988 | Schlagmuller |
| 4,757,223 A | 7/1988 | Ueyama |
| 4,769,569 A | 9/1988 | Stahlhuth |
| 4,777,398 A | 10/1988 | Shibuya |
| 4,783,610 A | 11/1988 | Asano |
| 4,793,313 A | 12/1988 | Paganon et al. |
| 4,803,908 A | 2/1989 | Skinn et al. |
| 4,808,874 A | 2/1989 | Stahlhuth |
| 4,816,713 A | 3/1989 | Change, Jr. |
| 4,821,726 A | 4/1989 | Tamura et al. |
| 4,835,747 A | 5/1989 | Billet |
| 4,838,233 A | 6/1989 | Hayashi et al. |
| 4,847,193 A | 7/1989 | Richards et al. |
| 4,857,791 A | 8/1989 | Uchino et al. |
| 4,874,978 A | 10/1989 | Sakaida et al. |
| 4,874,979 A | 10/1989 | Rapp |
| 4,874,980 A | 10/1989 | Mine et al. |
| 4,893,750 A | 1/1990 | Haworth et al. |
| 4,909,126 A | 3/1990 | Skinn et al. |
| 4,929,859 A | 5/1990 | Suzuki et al. |
| 4,933,591 A | 6/1990 | Stahlhuth |
| 4,937,489 A | 6/1990 | Hattori et al. |
| 4,940,037 A | 7/1990 | Eckert |
| 4,947,077 A | 8/1990 | Murata |
| 4,979,275 A | 12/1990 | Sakaida et al. |
| 4,999,284 A | 3/1991 | Ward et al. |
| 5,004,946 A | 4/1991 | Sakaida et al. |
| 5,009,142 A | 4/1991 | Kurtz |
| 5,027,027 A | 6/1991 | Orbach et al. |
| 5,028,834 A | 7/1991 | Sakaida et al. |
| 5,034,647 A | 7/1991 | Ohtsuka |
| 5,038,657 A | 8/1991 | Busley |
| 5,040,514 A | 8/1991 | Kubach |
| 5,063,542 A | 11/1991 | Petermann et al. |
| 5,065,660 A | 11/1991 | de Buda |
| 5,072,288 A | 12/1991 | MacDonald et al. |
| 5,078,241 A | 1/1992 | Ackermann et al. |
| 5,080,079 A | 1/1992 | Yoshida et al. |
| 5,094,429 A | 3/1992 | Dostert |
| 5,109,885 A | 5/1992 | Tauscher |
| 5,115,880 A | 5/1992 | Sallas et al. |
| 5,157,256 A | 10/1992 | Aaron |
| 5,161,774 A | 11/1992 | Engelsdorf et al. |
| 5,182,484 A | 1/1993 | Culp |
| 5,191,252 A | 3/1993 | Sano |
| 5,199,641 A | 4/1993 | Hohm et al. |
| 5,205,147 A | 4/1993 | Wada et al. |
| 5,237,238 A | 8/1993 | Berghaus et al. |
| 5,239,904 A | 8/1993 | Yamaguchi et al. |
| 5,270,984 A | 12/1993 | Mine |
| 5,314,175 A | 5/1994 | Izumi et al. |
| 5,319,257 A | 6/1994 | McIntyre |
| 5,323,680 A | 6/1994 | Miller et al. |
| 5,323,948 A | 6/1994 | Yamazaki et al. ........... 228/4.5 |
| 5,328,149 A | 7/1994 | Reuter |
| 5,332,942 A | 7/1994 | Rennex |
| 5,335,862 A | 8/1994 | Esper |
| 5,343,793 A | 9/1994 | Pattie |
| RE34,823 E | 1/1995 | Sakaida et al. |
| 5,388,751 A | 2/1995 | Harada et al. ............... 228/4.5 |
| 5,390,579 A | 2/1995 | Burgon |
| 5,410,206 A | 4/1995 | Luecke et al. |
| 5,410,207 A | 4/1995 | Miura et al. |
| 5,413,076 A | 5/1995 | Koenigswieser et al. |
| 5,425,343 A | 6/1995 | Akaki et al. |
| 5,435,477 A | 7/1995 | Torihata et al. |
| 5,444,324 A | 8/1995 | Priest et al. |
| 5,460,202 A | 10/1995 | Hanley et al. |
| 5,465,021 A | 11/1995 | Visscher et al. |
| 5,477,831 A | 12/1995 | Akaki et al. |
| 5,479,064 A | 12/1995 | Sano |
| 5,482,213 A | 1/1996 | Matsusaka et al. |
| 5,500,777 A | 3/1996 | Hasegawa et al. |
| 5,501,986 A | 3/1996 | Ward et al. |
| 5,518,184 A | 5/1996 | Potz et al. |
| 5,645,226 A | 7/1997 | Bright |
| 5,685,485 A | 11/1997 | Mock et al. |
| 5,697,554 A | 12/1997 | Auwaerter et al. |
| 5,712,524 A | 1/1998 | Suga |
| 5,746,422 A | 5/1998 | Harada et al. ............... 269/172 |
| 5,751,090 A | 5/1998 | Henderson |
| 5,779,149 A | 7/1998 | Hayes, Jr. |
| 5,780,759 A | 7/1998 | Szalay |
| 5,780,956 A | 7/1998 | Oliver et al. |
| 5,780,957 A | 7/1998 | Oliver et al. |
| 5,803,370 A | 9/1998 | Heinz et al. |
| 5,810,255 A | 9/1998 | Itoh et al. |

| | | |
|---|---|---|
| 5,824,929 A | 10/1998 | Freeland et al. |
| 5,824,937 A | 10/1998 | Szalay |
| 5,831,264 A | 11/1998 | Shedd et al. |
| 5,847,387 A | 12/1998 | Shedd et al. |
| 5,859,378 A | 1/1999 | Freeland et al. |
| 5,859,561 A | 1/1999 | Vanoli |
| 5,875,764 A | 3/1999 | Kappel et al. |
| 5,881,767 A | 3/1999 | Loser |
| 5,883,323 A | 3/1999 | Kaufman |
| 5,886,270 A | 3/1999 | Wynn |
| 5,901,896 A | 5/1999 | Gal |
| 5,907,211 A | 5/1999 | Hall et al. |
| 5,907,212 A | 5/1999 | Okada |
| 5,907,269 A | 5/1999 | Zrostlik |
| 5,934,976 A | 8/1999 | Makino et al. |
| 5,946,969 A | 9/1999 | Munekata et al. |
| 5,975,428 A | 11/1999 | Potschin et al. |
| 5,977,467 A | 11/1999 | Freeland et al. |
| 6,003,836 A | 12/1999 | Cewers |
| 6,016,040 A | 1/2000 | Hoffmann et al. |
| 6,021,760 A | 2/2000 | Boecking |
| 6,025,671 A | 2/2000 | Boecking |
| 6,035,722 A | 3/2000 | Giersch et al. |
| 6,040,643 A | 3/2000 | Bruns |
| 6,060,814 A | 5/2000 | Hoffmann et al. |
| 6,062,533 A | 5/2000 | Kappel et al. |
| 6,104,125 A | 8/2000 | Pan et al. |
| 6,131,879 A | 10/2000 | Kluge et al. |
| 6,166,307 A | 12/2000 | Caulkins et al. |
| 6,242,846 B1 * | 6/2001 | Ashizawa et al. ..... 310/323.02 |
| 6,246,157 B1 | 6/2001 | Oliver et al. |
| 6,246,287 B1 | 6/2001 | Yamashita |
| 6,291,928 B1 | 9/2001 | Lazarus et al. |
| 6,294,859 B1 | 9/2001 | Jaenker |
| 6,411,009 B2 | 6/2002 | Jaenker |

FOREIGN PATENT DOCUMENTS

| | | | |
|---|---|---|---|
| JP | 62217880 | 9/1987 | |
| JP | 3234981 | 10/1991 | |
| JP | 5-305574 | 11/1993 | |
| JP | 6105568 | 4/1994 | |
| JP | 8093944 | 4/1996 | |
| WO | WO 98/23868 | 11/1997 | |
| WO | WO0179731 A | 10/2001 | ........... F16K/31/02 |

OTHER PUBLICATIONS

Xu Wei, King Tim: "Flexure Hinges for Piezo Actuator Displacement Amplifiers: Flexibility, Accuracy, and Stress Considerations" Precision Enginngeering, vol. 19, No. 1, Jul. 1996, pp. 4–10, XP002256802.

* cited by examiner

APPARATUS HAVING A PAIR OF OPPOSING SURFACES DRIVEN BY A PIEZOELECTRIC ACTUATOR

CROSS-REFERENCE TO RELATED APPLICATIONS

This application is a divisional application of U.S. Ser. No. 09/771,533 filed on Jan. 29, 2001 now U.S. Pat. No. 6,548,938 which claims the benefit of U.S. Provisional Application No. 60/198,056, filed Apr. 18, 2000, and U.S. Provisional Application No. 60/220,542, filed Jul. 25, 2000.

FIELD OF THE INVENTION

The present invention relates to an apparatus having a pair of opposing surfaces driven by an actuator and, more specifically, by a piezoelectric device for clamping and/or valving purposes.

BACKGROUND OF THE INVENTION

Clamps and valves are required in a wide variety of modern applications. For example, clamps and valves are used throughout industry, transportation, architecture, etc. As a result, many different types of clamps and valves have been designed for one or more specific applications.

Presently, electro-magnetic solenoids are used in a wide variety of clamping and valving applications. However, electro-magnetic solenoids have many shortcomings. In general, solenoids are relatively large and heavy. Solenoids consume relatively high amounts of power to remain energized. When supplied with only a reduced amount of power, solenoids operate unpredictably. It is difficult to maintain a solenoid in a partially open or partially closed position. Solenoids have relatively slow cycle times, provide weak opening and closing forces, and generate EMF (electromotive force). Differential pressure is required to operate most solenoids. When designed as a valve, most solenoids are gravity sensitive and include a fixed inlet valve port and a fixed outlet valve port requiring a predetermined installation orientation. Recently, piezoelectric bimorphs have also been used in some valve applications. Piezoelectric bimorph valves have several advantages including low power consumption, small size, light weight, and fast cycle times. Piezoelectric bimorph valves can be operated in a partially open or partially closed valve position. However, such valves produce relatively weak valve sealing forces resulting in substantial potential for fluid leakage.

SUMMARY OF THE INVENTION

The present invention provides an apparatus having at least one pair of opposing surfaces formed on a support structure for movement relative to one another and an actuator operably engaging the support structure for driving the at least one pair of opposing surfaces relative to one another in response to an electrical activation of the actuator. Preferably, the actuator is a piezoelectric device. The apparatus can be adapted for clamping and/or valving applications.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
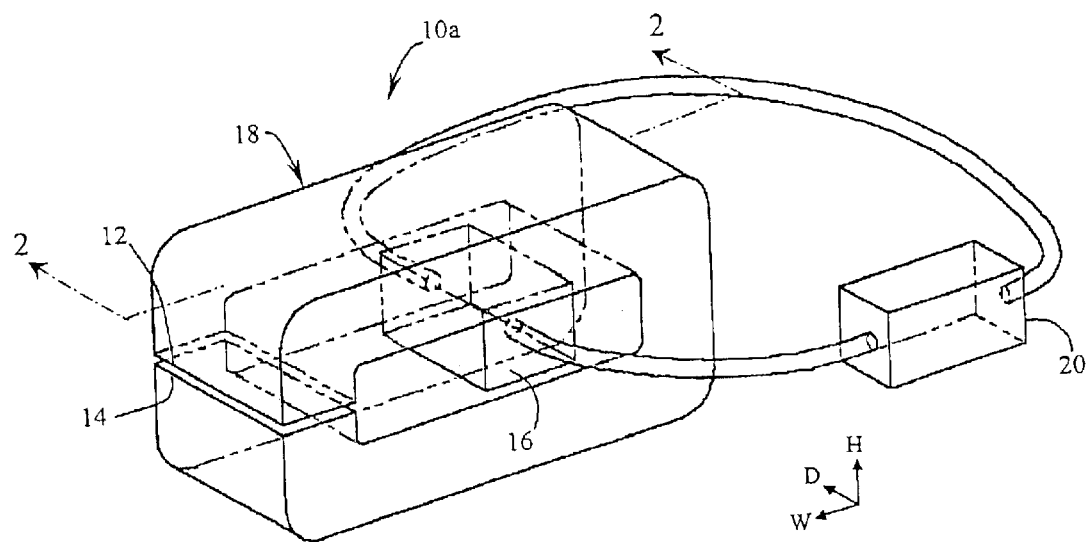
FIG. 1 is a perspective view of a first embodiment of an apparatus having a pair of opposing surfaces and a support structure including one web in accordance with the present invention.

FIG. 1 is a perspective view of a first embodiment of an apparatus 10a in accordance with the present invention. The apparatus 10a includes at least one pair of opposing surfaces 12 and 14 and an actuator 16. The opposing surfaces 12 and 14 are formed on a support structure 18 for movement relative to one another. The actuator 16 operably engages the support structure 18 for driving the opposing surfaces 12 and 14 relative to one another in response to an electrical activation from a controller 20 in communication with the actuator 16.

When activated, the actuator 16 is designed to produce a positional or spatial displacement along one predetermined axis. The function of the actuator 16 may be performed by one of several different types of piezoelectric devices.

In the simplest embodiment, the actuator 16 includes a single or individual piezoelectric element. This type of piezoelectric device is generally a monolithic structure of polycrystalline ferroelectric ceramic material, such as Lead Zirconate Titanate (PZT). However, other materials may also be used to provide various performance characteristics including, for example, increasing the temperature at which the piezoelectric element exhibits piezoelectric effects. Presently, a single piezoelectric element is capable of providing only a relatively small spatial displacement.

In an alternative embodiment, the actuator 16 includes a stack of individual piezoelectric elements. A stack of piezoelectric elements may be constructed by various means, such as chemically bonding individual piezoelectric elements to each other or encasing individual piezoelectric elements within a rigid tube enclosure. In this type of piezoelectric device, the individual piezoelectric elements are electrically connected in parallel. Thus, when a voltage is applied across the piezoelectric device, each individual piezoelectric element is activated. As a result, the spatial displacement of the entire stack is equal to the sum of the spatial displacement of each individual piezoelectric element. A stack of piezoelectric elements can provide substantial spatial displacement. Presently, this type of piezoelectric device is relatively large and expensive.

In yet another alternative embodiment, the actuator 16 includes a mechanically amplified piezoelectric element or stack. In this type of piezoelectric device, the spatial displacement produced by a single piezoelectric element or stack is mechanically amplified by a simple mechanical machine, such as a lever. Complex versions of this type of piezoelectric device are commonly referred to as flextensional amplifiers. Presently, such amplifiers are capable of providing relatively large spatial displacement. However, this type of piezoelectric device is capable of handling only relatively low load forces.

In still yet another alternative embodiment, the actuator 16 includes a multilayer cofired piezoelectric stack. Unlike the stack of individual piezoelectric elements described above wherein a plurality of individual piezoelectric elements are joined or assembled together, the raw chemical components for a multilayer cofired piezoelectric stack are milled and prepared into a slurry. The slurry is foil or tape cast in a process similar to that used to produce ceramic capacitors. The cast slurry is then coated, using screen-printing, sputtering, or other such means, with a very thin conductive material that forms an electrode. An insulating material is then applied producing a layered insulator/electrode/piezo material/electrode structure. This sequence of steps is repeated a predetermined number of times to produce a piezoelectric stack (i.e. a stack having a layered insulator/electrode/piezo material/electrode/insulator/electrode/piezo material/electrode . . . structure). The integrally formed piezoelectric stack is then sintered or cofired. The electrodes are electrically terminated such that the individual layers are electrically connected in parallel. Finally, the piezo material is poled, or in other words polarized, and made piezoelectric. Poling is accomplished by applying an electric field to the piezoelectric stack. When the electric field is applied, the piezo material expands along the axis of the electric field due to the alignment of the electric dipoles in the piezo material. After the electric field is removed, the piezo material retains residual polarization. As a result, when an electric field or voltage is properly applied across the piezoelectric material, a distortion occurs causing a dimensional expansion along the axis aligned with the electric field. Multilayer cofired piezoelectric stacks have many advantageous characteristics including, but not limited to, providing a relatively large spatial displacement, producing high expansion forces, and operating at relatively low voltages in a relatively light weight, small package.

Each type of piezoelectric device described above operates in substantially the same manner. The piezoelectric device can be (1) electrically charged using a voltage, or (2) electrically discharged using a controlled electrical ground or short. The piezoelectric device has a nominal three-dimensional size (i.e. a displacement along an X axis, Y axis, and Z axis) providing a spatial displacement proportional to a nominal thickness of the device along one predetermined axis.

When a voltage is applied across the piezoelectric device, the device receives and stores an electrical charge. When charged, the piezoelectric device expands along the one predetermined axis. The expansion of the piezoelectric device produces a spatial displacement along the one predetermined axis greater than the nominal thickness of the device. In this manner, the one predetermined axis functions as an axis of displacement. The amount of electrical charge stored by the piezoelectric device is generally proportional to the amount of voltage applied across the device up to a maximum voltage limit. The amount of expansion along the one predetermined axis is generally proportional to the amount of electrical charge stored by the piezoelectric device. Thus, the amount of expansion along the one predetermined axis can be controlled by varying the amount of voltage applied across the piezoelectric device. For example, applying the maximum amount of voltage across the piezoelectric device produces a maximum amount of expansion along the one predetermined axis and applying one-half the maximum amount of voltage across the piezoelectric device produces approximately one-half the maximum amount of expansion along the one predetermined axis.

After the voltage is disconnected, the piezoelectric device remains substantially charged and, thus, substantially expanded along the one predetermined axis. However, in accordance with normal operation when the voltage is disconnected, the piezoelectric device relatively slowly discharges and, thus, continuously contracts or shrinks a relatively small or negligible amount over a predetermined period of time until the device returns to the nominal thickness. To prevent the relatively slow, continuous discharge and shrinkage, the controller 20 can be designed to provide a relatively minute compensating voltage across the actuator 16.

The electrical charge on the piezoelectric device is discharged or dissipated when the device is (1) connected directly to ground, (2) electrically shorted directly across the terminal ends, or (3) electrically shorted or grounded through an impedance. When discharged, the piezoelectric device contracts or shrinks along the one predetermined axis back toward the nominal thickness of the device. The speed of contraction, or in other words the amount of shrinkage along the one predetermined axis within a specific period of time, is a function of the speed of discharge and, thus, type of electrical grounding or shorting. Grounding the piezoelectric device directly to earth results in a relatively quick discharge and, thus, produces a relatively large amount of shrinkage within a relatively short period of time. Conversely, grounding the piezoelectric device through an impedance, such as a resistor, results in a controlled discharge and, thus, produces a controlled amount of shrinkage within a defined period of time. Directly shorting the piezoelectric device results in a relatively quick discharge and, thus, produces a relatively large amount of shrinkage within a relatively short period of time. Conversely, shorting the piezoelectric device through an impedance, such as a resistor, results in a controlled discharge and, thus, produces a controlled amount of shrinkage within a relatively short period of time. Accordingly, the discharge of the piezoelectric device can be controlled to produce a spatial displacement along the one predetermined axis greater than or proportional to the nominal thickness of the device. In actual use, and excluding parasitic influences, the piezoelectric device will normally be discharged through an impedance.

The controller 20 is designed to operate the apparatus 10a. To produce a spatial displacement along the predetermined axis, the controller 20 provides a charging voltage across the piezoelectric device. Typically, the amount of spatial displacement is proportional to the charging energy. To return the piezoelectric device to the nominal thickness, the controller 20 provides the necessary discharge means (i.e. the controlled electrical grounding or shorting) described above. The controller 20 is programmed to completely charge and completely discharge the piezoelectric device. As a result, the opposing surfaces 12 and 14 of the apparatus 10a are maintained in either a fully open or fully closed position. The controller 20 can be programmed to partially charge and partially discharge the piezoelectric device. As a result, the opposing surfaces 12 and 14 of the apparatus 10a can be maintained in the fully open position, the fully closed position, or any position therebetween (i.e any partially open or partially closed position). The partial opening and closing of the opposing surfaces 12 and 14 may be based directly on sensor feedback or on an algorithm processing such sensor feedback. The controller 20 can be further programmed to recycle discharged power by storing power discharged from the piezoelectric device and reusing such power during the next charging of the piezoelectric device. The controller 20 can also be further programmed to supply such recycled discharged power to one or more other piezoelectric or non-piezoelectric devices.

When a negative voltage is applied across the piezoelectric device, the device receives and stores a negative electrical charge. When negatively charged, the piezoelectric device contracts along the one predetermined axis. The contraction of the piezoelectric device produces a spatial displacement along the one predetermined axis less than the nominal thickness of the device. Accordingly, each embodiment of the present invention can be adapted to operate in response to the spatial displacement produced when the piezoelectric device contracts and/or expands along the predetermined axis between (1) the nominal thickness of the device and a fully expanded state when a maximum positive voltage is applied, (2) the nominal thickness of the device and a fully contracted state when a maximum negative voltage is applied, or (3) between the fully contracted state (i.e. maximum negative voltage) and the fully expanded state (i.e. maximum positive voltage).

Figure 2:
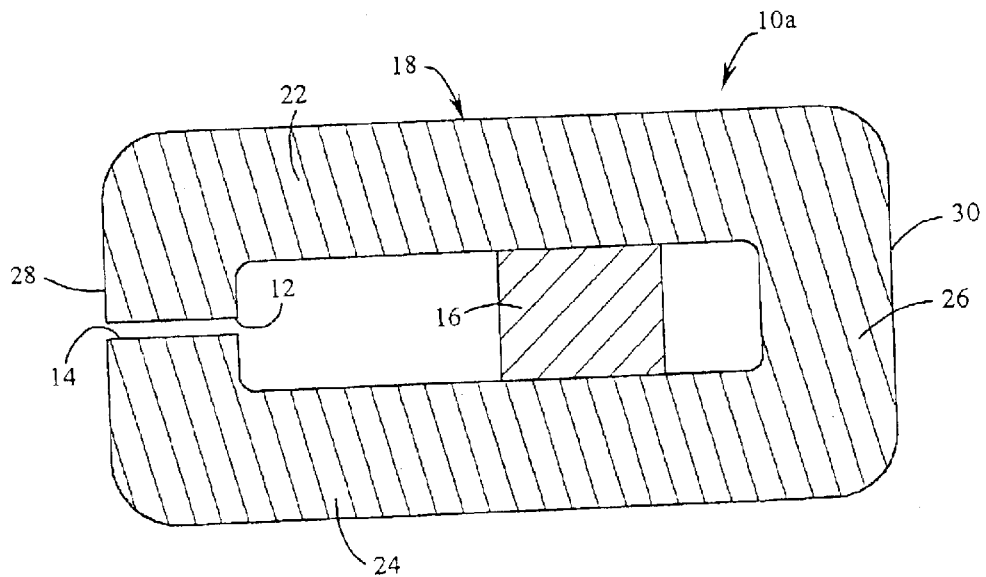
FIG. 2 is a cross-sectional view of the first embodiment of the apparatus taken along lines 2—2 in FIG. 1.

FIG. 2 is a cross-sectional view of the first embodiment of the apparatus 10a. The support structure 18 includes first and second arms 22 and 24 and at least one web or fulcrum 26 extending transversely between the first and second arms 22 and 24. The opposing surfaces 12 and 14 are disposed at a first end 28 of the first and second arms 22 and 24 respectively. To maximize reliability and performance and optimize manufacturing, the support structure 18, including the web 26 and the first and second arms 22 and 24, can be integrally formed.

Figure 18:
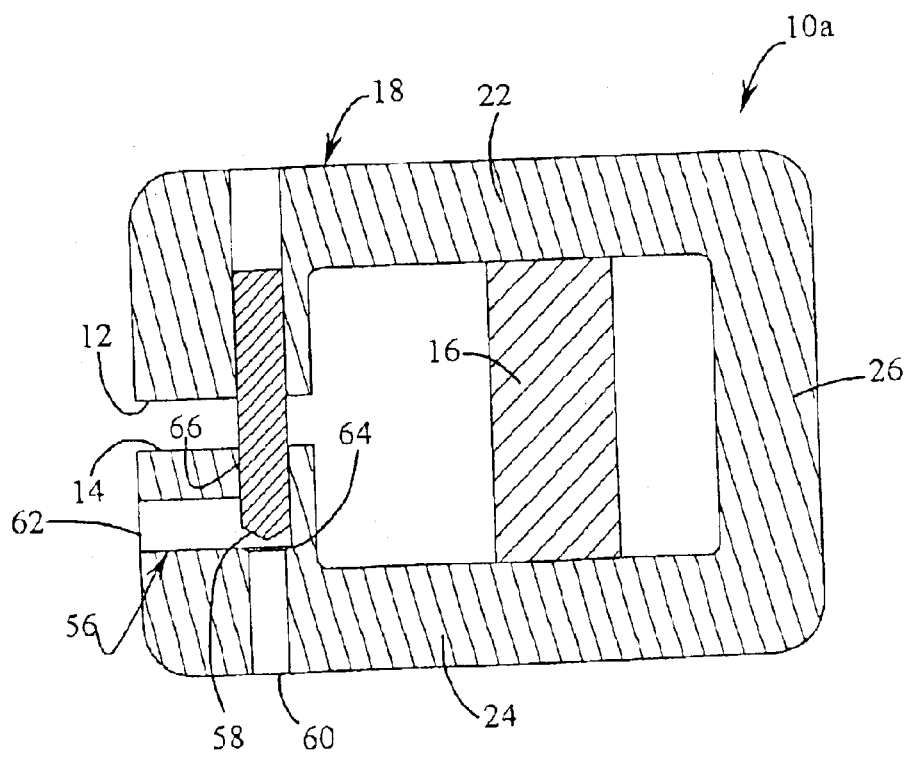
FIG. 18 is a cross-sectional view of the first embodiment of the apparatus with the support structure including a second type of fluid flow passageway and a second type of valve surface.

In the first embodiment of the apparatus 10a, the web 26 extends between the first and second arms 22 and 24 at a second end 30 opposite the first end 28 establishing a substantially C-shaped cross-section. The actuator 16 is operably engaged between the first and second arms 22 and 24 for driving the first and second arms 22 and 24 away or apart from one another in response to an electrical activation of the actuator 16. In other words, the piezoelectric device is oriented such that the one predetermined axis or axis of displacement is aligned perpendicular to the first and second arms 22 and 24. In the first embodiment of the apparatus 10a, the actuator 16 may be disposed at any position between the first end 28 of the first and second arms 22 and 24 and the web 26. However, the preferred position of the actuator 16 is carefully selected to maximize performance of the apparatus 10a in one or more specific applications. For example, the apparatus 10a may be used as a valve as illustrated in FIG. 18. In this valving application, key performance parameters are (1) flow rate and (2) operating pressure. Basic engineering calculations are used to establish the overall geometry of the apparatus 10a and the position of the actuator 16, in light of the performance requirements for the apparatus 10a. Finite Element Analysis (FEA) is used to verify and further refine the design of the apparatus 10a. This general methodology applies to the use and optimization of other design variations and embodiments of this invention, including all embodiments and designs specifically described and illustrated in this disclosure.

In the first embodiment of the apparatus 10a, the opposing surfaces 12 and 14 are normally immediately or nearly adjacent to one another. In other words, the opposing surfaces 12 and 14 are closest to each other when the actuator 16 is deactivated. This type of configuration is commonly referred to as a normally closed design. When the actuator 16 is electrically activated, the first and second arms 22 and 24 are driven away or apart from one another. In this manner, the space or distance between the opposing surfaces 12 and 14 is increased. In other words, when a voltage is applied across the piezoelectric device, the spatial displacement produced along the predetermined axis drives the first and second arms 22 and 24 away or apart from one another thus increasing the space or distance between the opposing surfaces 12 and 14. The opening of the opposing surfaces 12 and 14 can be adjusted by varying the amount of voltage applied across the piezoelectric device. Thus, the distance between the opposing surfaces 12 and 14 is a function of the amount of expansion along the axis of displacement relative to the voltage applied, the position of the actuator 16 relative to the web 26, and the length of the first and second arms 22 and 24.

The support structure 18 is composed of a material having shape memory. Typically, the support structure material has a high modulus of elasticity and high strength. As a result, the apparatus 10a can be made from a variety of materials including, but not limited to, a metal, such as steel or other metals, an alloy, such as Inconel or other alloys, or a composite material, such as Thornel.

When the actuator 16 is deactivated, the opposing surfaces 12 and 14 are biased toward one another by the shape memory of the support structure material provided the support structure 18 has not been plastically deformed. In other words, when the piezoelectric device is discharged, the device shrinks or contracts along the one predetermined axis and the shape memory of the support structure material biases the first and second arms 22 and 24 and the opposing surfaces 12 and 14 back toward the original shape of the apparatus 10a. The closing of the opposing surfaces 12 and 14 can be adjusted by controlling the discharge of the piezoelectric device. In this manner, the first embodiment of the apparatus 10a is particularly adapted to function as a normally closed clamp.

Within the scope of the present invention, the actuator 16 may alternatively be disposed at the first end 28 of the first and second arms 22 and 24 with the opposing surfaces 12 and 14 positioned between the actuator 16 and the web 26.

Figure 3:
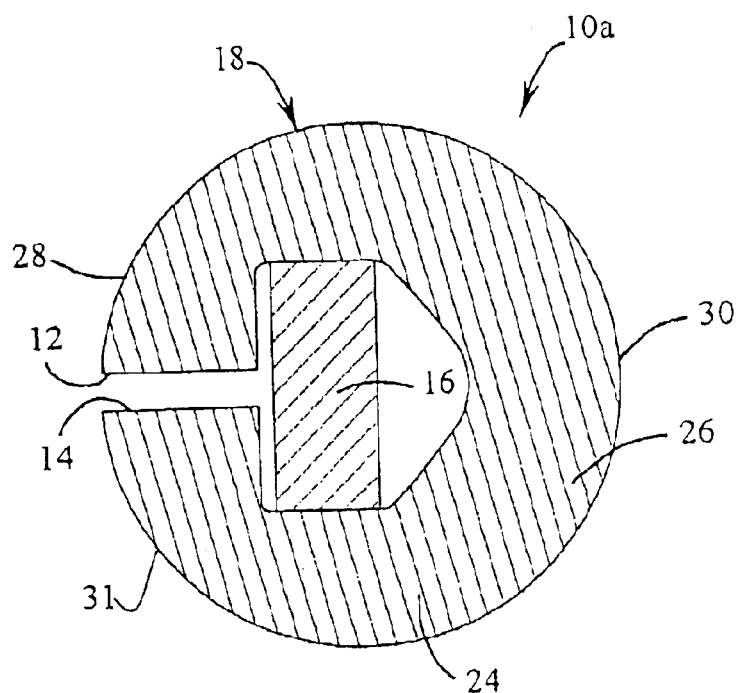
FIG. 3 is a cross-sectional view of the first embodiment of the apparatus with the support structure having a circular shaped outer surface.

FIG. 3 is a cross-sectional view of the first embodiment of the apparatus 10a with the support structure 18 having a circular shaped outer surface 31. With the circular shaped outer surface 31, the actuator 16 is disposed near the opposing surfaces 12 and 14 resulting in a nearly or approximately proportional relationship between the amount of actuator displacement and the change in the space or distance between the opposing surfaces 12 and 14. Further, with the circular shaped outer surface 31, clamping force between the opposing surfaces 12 and 14 is increased.

Figure 4:
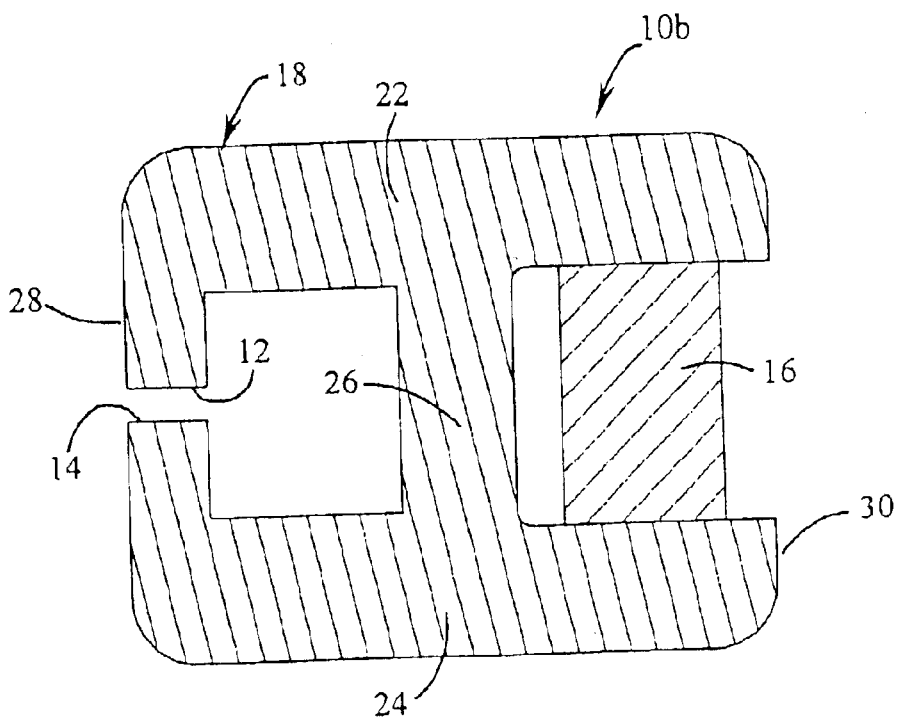
FIG. 4 is a cross-sectional view of a second embodiment of the apparatus having a pair of opposing surfaces and a support structure including one web.

FIG. 4 is a cross-sectional view of a second embodiment of the apparatus 10b. In the second embodiment of the apparatus 10b, the at least one web 26 extends between the first and second arms 22 and 24 at a position between or intermediate with respect to the first end 28 and the second end 30 establishing a substantially I-shaped cross-section. The actuator 16 is operably engaged between the first and second arms 22 and 24 for driving the first and second arms 22 and 24 in response to an electrical activation of the actuator 16. In other words, the piezoelectric device is oriented such that the one predetermined axis or axis of displacement is aligned perpendicular to the first and second arms 22 and 24. In the second embodiment of the apparatus 10b, the actuator 16 may be disposed at any position between the web 26 and the second end 30 of the first and second arms 22 and 24.

In the second embodiment of the apparatus 10b, the opposing surfaces 12 and 14 are normally spaced from one another. In other words, the opposing surfaces 12 and 14 are furthest from each other when the actuator 16 is deactivated. This type of configuration is commonly referred to as a normally open design. When the actuator 16 is electrically activated, the second ends 30 of the first and second arms 22 and 24 are driven away or apart from one another and the first ends 28 of the first and second arms 22 and 24 are driven toward one another. In this manner, the space or distance between the opposing surfaces 12 and 14 is decreased. In other words, when a voltage is applied across the piezoelectric device, the spatial displacement produced along the predetermined axis drives the second ends 30 of the first and second arms 22 and 24 away or apart from one another while driving the first ends 28 of the first and second arms 22 and 24 toward one another thus decreasing the distance or space between the opposing surfaces 12 and 14. The closing of the opposing surfaces 12 and 14 can be adjusted by varying the amount of voltage applied across the piezoelectric device. Thus, the distance between the opposing surfaces 12 and 14 is a function of the amount of expansion along the axis of displacement relative to the voltage applied, the position of the actuator 16 relative to the web 26, and the length of the first and second arms 22 and 24.

The support structure 18 is composed of a material having shape memory. Typically, the support structure material has a high modulus of elasticity and high strength. As a result, the apparatus 10b can be made from a variety of materials including, but not limited to, a metal, such as steel or other metals, an alloy, such as Inconel or other alloys, or a composite material, such as Thornel.

When the actuator 16 is deactivated, the opposing surfaces 12 and 14 are biased away or apart from one another by the shape memory of the support structure material provided the support structure 18 has not been plastically deformed. In other words, when the piezoelectric device is discharged, the device shrinks or contracts along the one predetermined axis and the shape memory of the support structure material biases the first and second arms 22 and 24 and the opposing surfaces 12 and 14 back toward the original shape of the apparatus 10b. The opening of the opposing surfaces 12 and 14 can be adjusted by controlling the discharge of the piezoelectric device. In this manner, the second embodiment of the apparatus 10b is particularly adapted to function as a normally open clamp.

Figure 5:
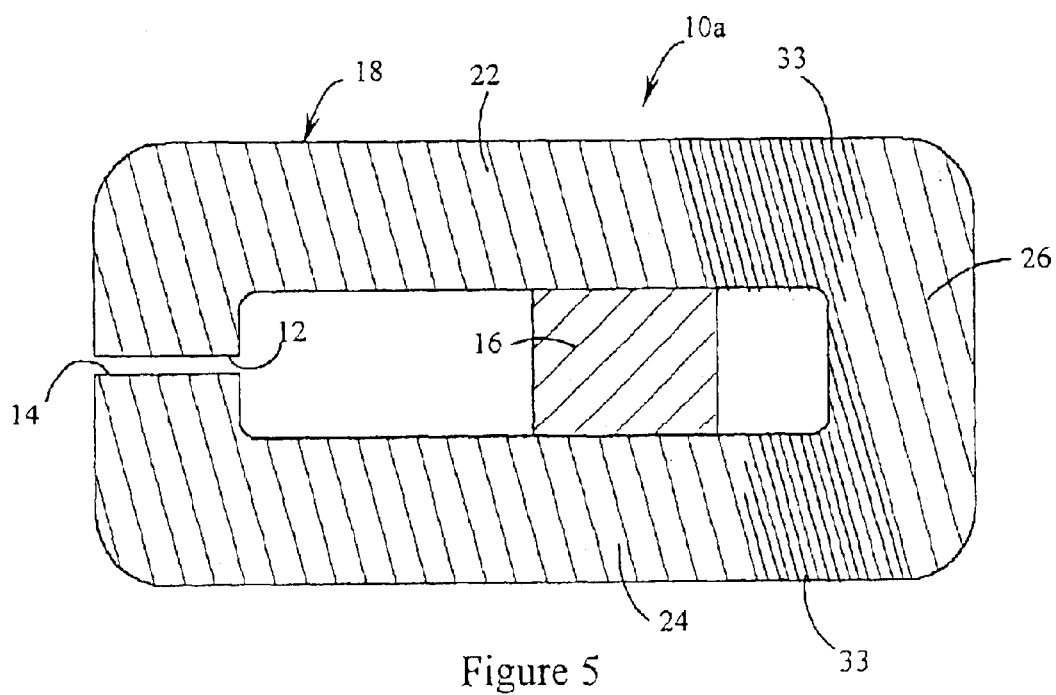
FIG. 5 is a cross-sectional view of the first embodiment of the apparatus including materially modified portions for establishing predetermined flex axes.

To facilitate the movement or bending of the first and second arms 22 and 24 of either a substantially C-shaped apparatus 10a, as illustrated in FIG. 2, or a substantially I-shaped apparatus 10b, as illustrated in FIG. 4, predetermined structural configurations can be formed to define preferred flex axes in the support structure. In FIG. 5, materially modified portions 33 are formed in the support structure 18 to establish predetermined flex axes. The materially modified portions 33 can be formed by altering the composition of the base support structure material, such as by forming the support structure 18 using powdered metal technology wherein the material at the flex axes differs in composition from the material forming the remainder of the support structure, especially with regard to stiffness and elasticity. Alternatively, the materially modified portions 33 can be formed by way of processing, such as localized heat treating. As described above, the support structure 18 can be made from a variety of materials. In FIGS. 6–10, reduced cross-sectional area portions 32 are provided at various locations in the support structure 18 to establish predetermined flex axes. FIGS. 6–10 illustrate the approximate location or position of such reduced cross-sectional area portions 32 with respect to the support structures 18. Although the reduced cross-sectional area portions 32 illustrated in FIGS. 6–10 are formed with concave indentations, other shapes, such as slots, may also be used to create flex axes.

Figure 6:
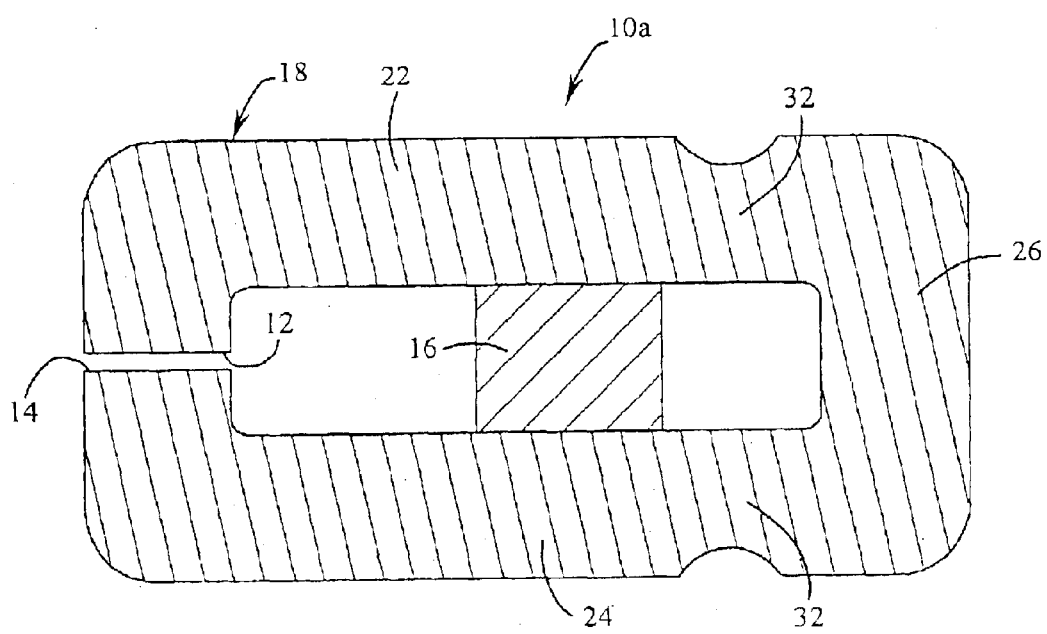
FIGS. 6–9 are cross-sectional views of the first embodiment of the apparatus including reduced cross-sectional area portions for establishing predetermined flex axes.
Figure 7:
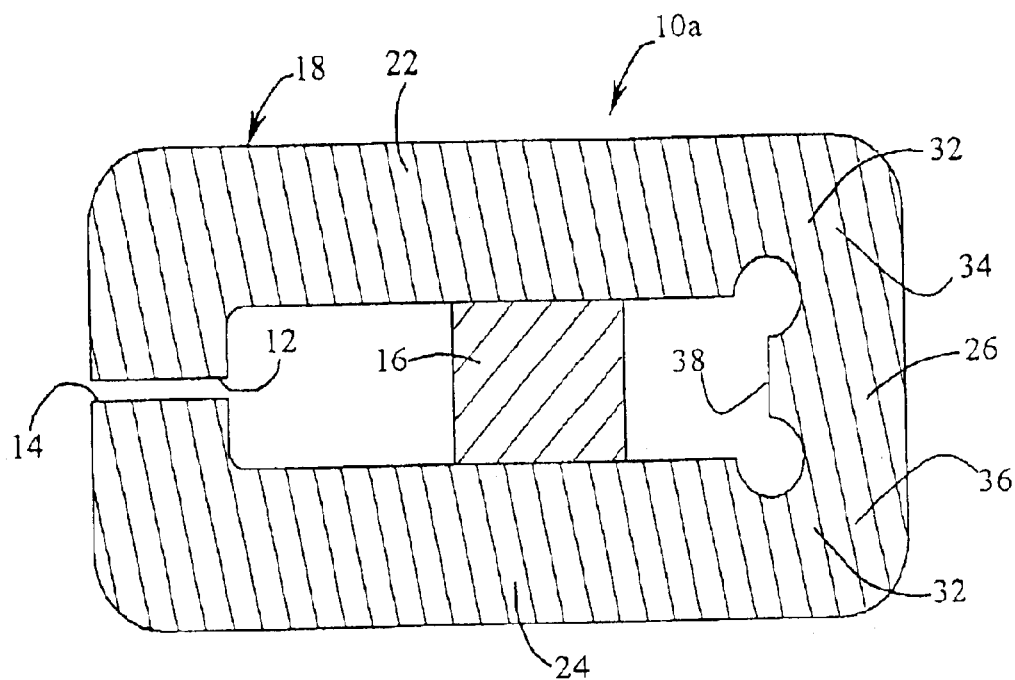
Figure 8:
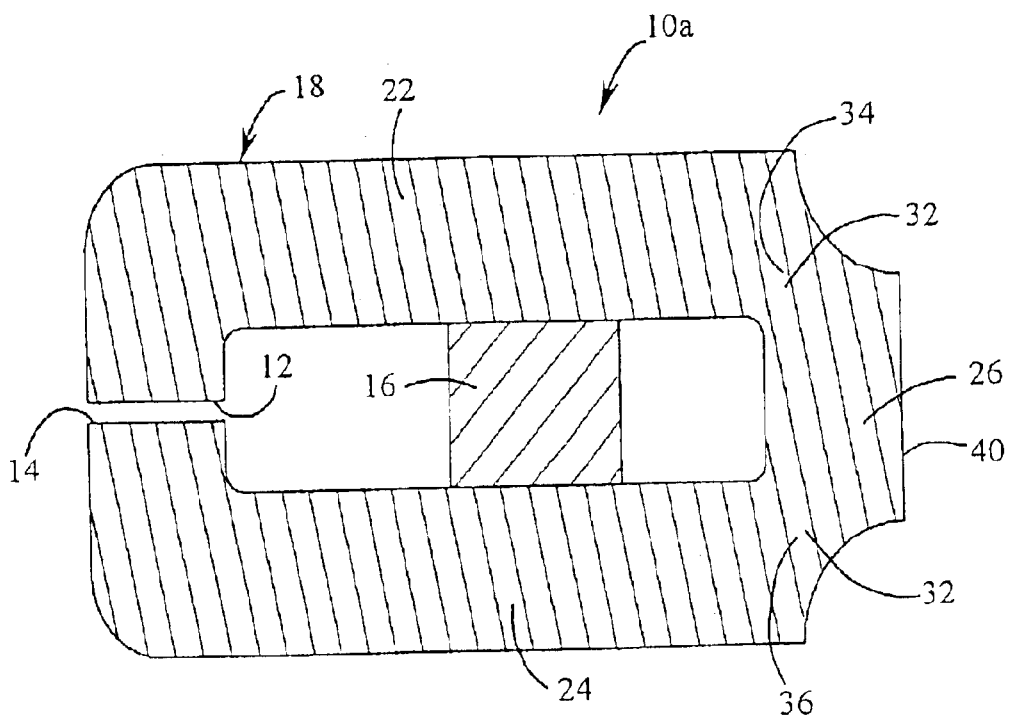
Figure 9:
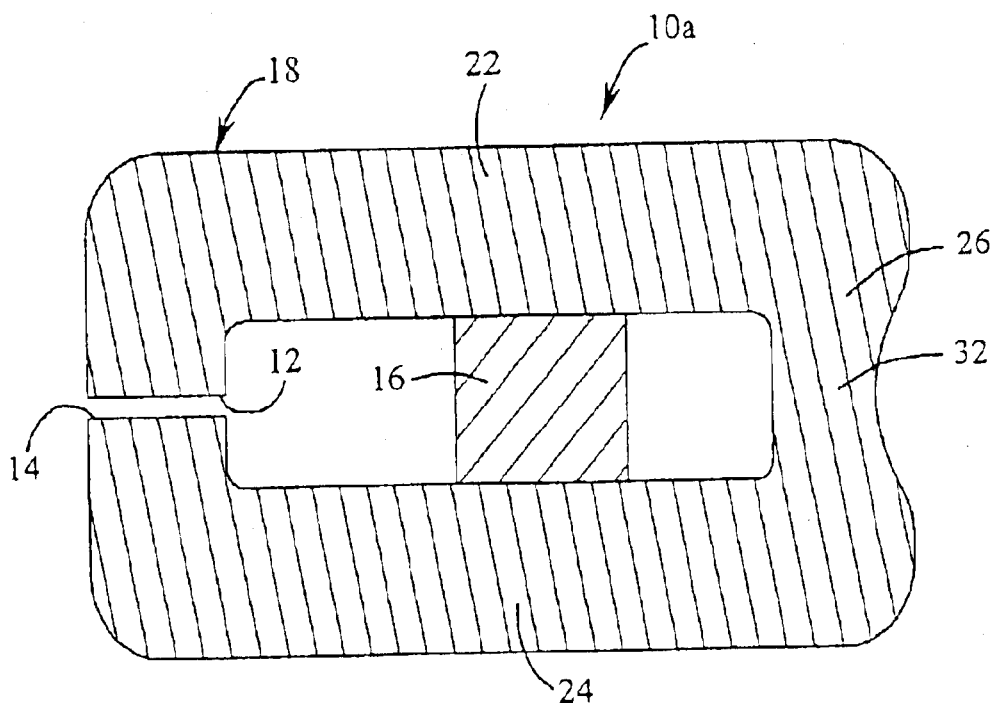

FIGS. 6–9 are cross-sectional views of the first embodiment of the apparatus 10a including reduced cross-sectional area portions 32 for establishing predetermined flex axes to facilitate the bending of the first and second arms 22 and 24. In FIG. 6, the first embodiment of the apparatus 10a includes reduced cross-sectional area portions 32 formed in the first and second arms 22 and 24. Preferably, such reduced cross-sectional area portions 32 are positioned along the respective arm 22 or 24 between the actuator 16 and the web 26. A reduced cross-sectional area portion 32 may be formed in one or both of the arms 22 and 24. In FIGS. 7 and 8, the first embodiment of the apparatus 10a includes reduced cross-sectional area portions 32 formed at one or both junctions 34 and 36 between the web 26 and the respective arm 22 or 24. In FIG. 7, the reduced cross-sectional area portions 32 are formed with concave indentations on an inner surface 38 of one or both of the web-arm junctions 34 and 36. In FIG. 8, the reduced cross-sectional area portions 32 are formed with concave indentations on an outer surface 40 of one or both of the web-arm junctions 34 and 36. Alternatively, the reduced cross-sectional area portions 32 can be formed with concave indentations on one or both of the inner surface 38 and the outer surface 40 of one or both of the web-arm junctions 34 and 36. In FIG. 9, the first embodiment of the apparatus 10a includes at least one reduced cross-sectional area portion 32 formed in the middle of the web 26.

Figure 10:
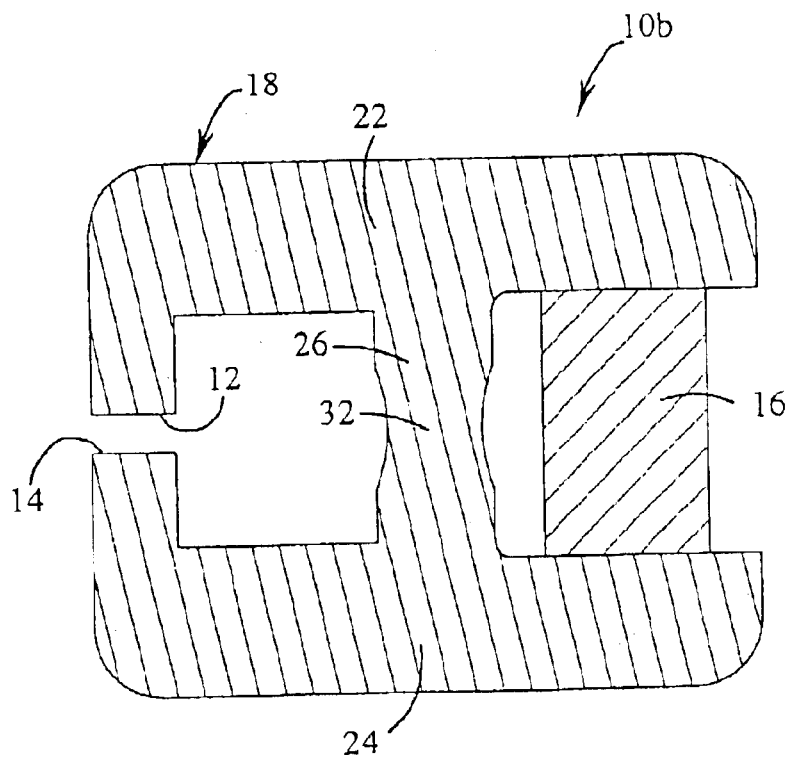
FIG. 10 is a cross-sectional view of the second embodiment of the apparatus including a reduced cross-sectional area portion for establishing a predetermined flex axis.

FIG. 10 is a cross-sectional view of the second embodiment of the apparatus 10b including at least one reduced cross-sectional area portion 32 formed in the web 26 for establishing a predetermined flex axis to facilitate the bending of the first and second arms 22 and 24.

Figure 11:
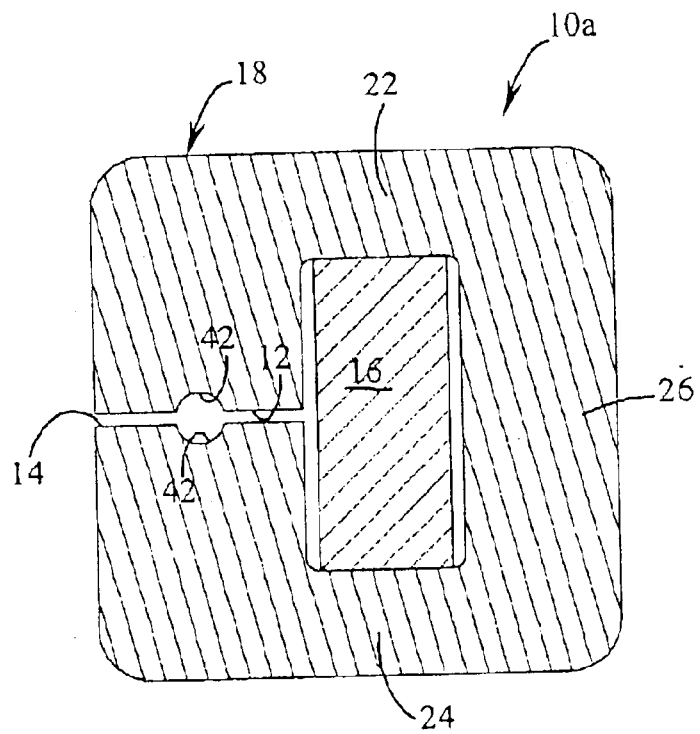
FIG. 11 is a cross-sectional view of the first embodiment of the apparatus with each of the pair of opposing surfaces including a shaped recess.

FIG. 11 is a cross-sectional view of the first embodiment of the apparatus 10a wherein each of the opposing surfaces 12 and 14 includes a shaped recess 42 complementary with respect to an article to be engaged therebetween. Although the shaped recesses 42 illustrated in FIG. 11 have a semi-circular shape, other shapes can also be used to complement an article to be engaged between the opposing surfaces 12 and 14. In one embodiment, only one of the opposing surfaces 12 or 14 includes a shaped recess 42. In another embodiment, each of the opposing surfaces 12 and 14 includes more than one shaped recess 42.

The length of the web 26 and the length of the first and second arms 22 and 24 can vary without departing from the scope of the present invention. Thus, for exemplary purposes, the substantially C-shaped apparatus 10a illustrated in FIG. 11 has a longer web 26 and shorter first and second arms 22 and 24 than the substantially C-shaped apparatus 10a illustrated in FIG. 2.

Within the scope of the present invention, shaped recesses 42 may also be formed on the opposing surfaces 12 and 14 of the second embodiment of the apparatus 10b illustrated in FIG. 4.

Figure 12:
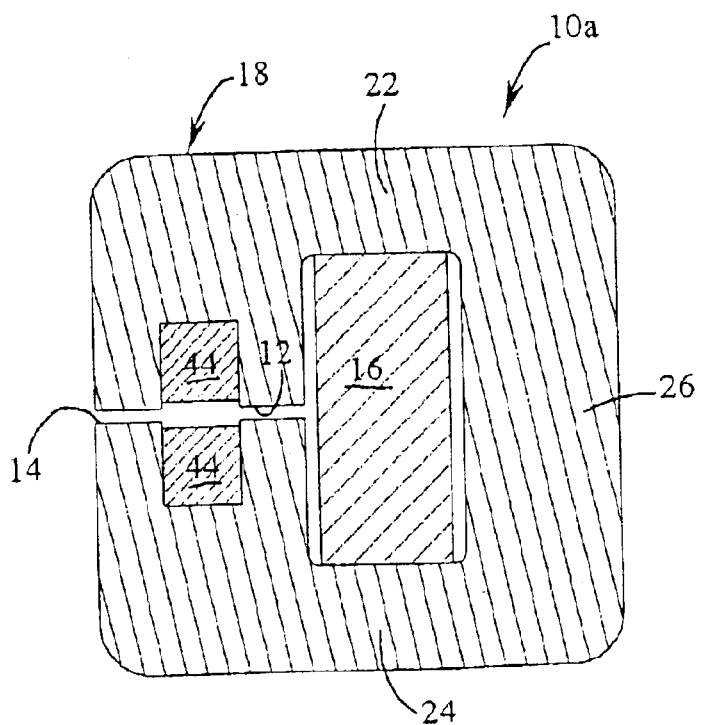
FIG. 12 is a cross-sectional view of the first embodiment of the apparatus with each of the pair of opposing surfaces including an article-engaging portion.

FIG. 12 is a cross-sectional view of the first embodiment of the apparatus 10a wherein each of the opposing surfaces 12 and 14 includes an article-engaging portion 44. The article-engaging portion 44 is composed of a material selected for a predetermined characteristic. The material can be selected to establish one or more of several characteristics including, but not limited to, establishing a coefficient of friction between an article to be engaged and the article-engaging portion 44 for clamping or holding purposes, conforming to a shape of an article to be engaged for protective purposes, providing thermal insulation between an article to be engaged and the apparatus 10a, providing electrical insulation between an article to be engaged and the apparatus 10a, and increasing electrical conductivity between an article to be engaged and the apparatus 10a. The article-engaging portion 44 can also be formed to include a shaped recess 42 as illustrated in FIG. 11. The article-engaging portion 44 is designed and adapted to be removed from the opposing surfaces 12 and 14 and replaced when such portion 44 is worn or damaged or to alter the performance characteristic of the apparatus 10a.

Within the scope of the present invention, article-engaging portions 44 may also be disposed on the opposing surfaces 12 and 14 of the second embodiment of the apparatus 10b illustrated in FIG. 4.

Alternatively, the present invention may be adapted such that the article-engaging portions 44 function similar to contacts of an electrical switch. More specifically, the article-engaging portions 44 function as an open electrical switch when the opposing surfaces 12 and 14 are spaced from each other and function as a closed electrical switch when the opposing surface 12 and 14 are adjacent to each other. When the article-engaging portions 44 are in contact with each other, electrical current from one article-engaging portion may flow to the other article-engaging portion.

Figure 13:
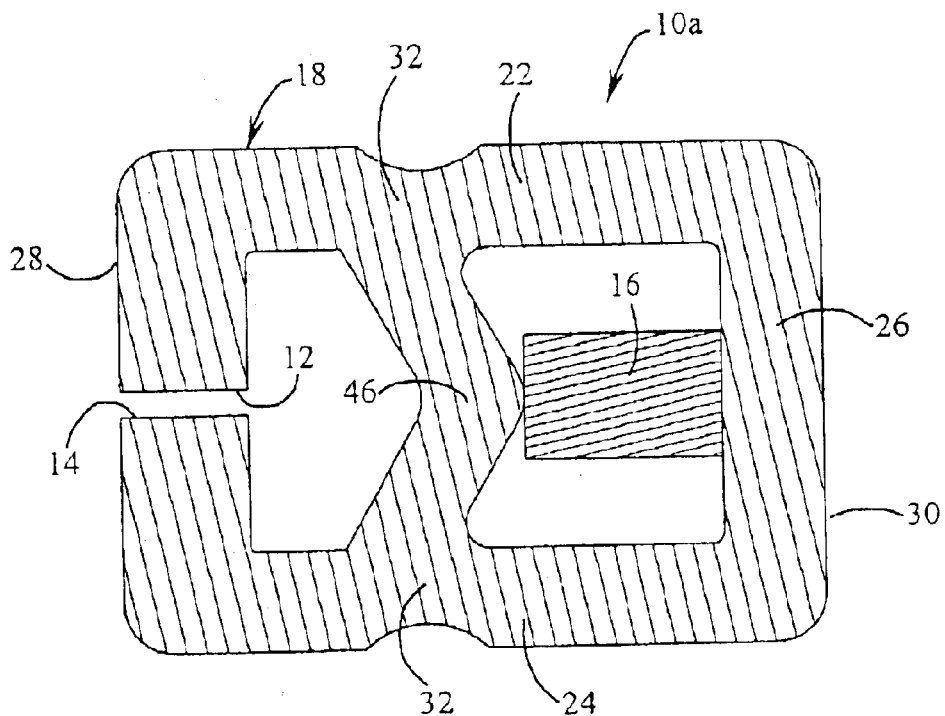
FIG. 13 is a cross-sectional view of the first embodiment of the apparatus with the support structure including a second web.

FIG. 13 is a cross-sectional view of the first embodiment of the apparatus 10a wherein the support structure 18 further includes a second web 46. The first web 26 may extend between the first and second arms 22 and 24 at any location spaced from the first end 28. In FIG. 13, the first web 26 extends between the first and second arms 22 and 24 at the second end 30. The second web 46 extends between the first and second arms 22 and 24 at a position between or intermediate with respect to the first end 28 and the first web 26. The actuator 16 is operably engaged between the first and second webs 26 and 46 to drive the first and second webs 26 and 46 away or apart from one another in response to an electrical activation of the actuator 16. More specifically, the actuator 16 is operably engaged between the first web 26 and the portion of the second web 46 which is closest or proximate to the first web 26.

The second web 46 is shaped with respect to the first web 26 and the first and second arms 22 and 24 such that the first and second arms 22 and 24 are driven away or apart from one another in response to an electrical activation of the actuator 16. In this manner, the space or distance between the opposing surfaces 12 and 14 is increased. In FIG. 13, the second web 46 is non-planar. Thus, when a voltage is applied across the piezoelectric device, the spatial displacement produced along the predetermined axis drives the first web 26 and the proximate portion of the second web 46 away or apart from one another and driving the non-planar second web 46 toward a planar shape. The driving of the second web 46 toward a planar shape drives the first and second arms 22 and 24 away or apart from one another thus increasing the space or distance between the opposing surfaces 12 and 14. The opening of the opposing surfaces 12 and 14 can be adjusted by varying the amount of voltage applied across the piezoelectric device. Thus, the distance between the opposing surfaces 12 and 14 is a function of the amount of expansion along the axis of displacement relative to the voltage applied, the length of the first and second arms 22 and 24, the geometry of the second web 46, the geometry and location of reduced cross-sectional area portions 32, and the modulus of elasticity of the support structure material.

When the actuator 16 is deactivated, the opposing surfaces 12 and 14 are biased toward one another by the shape memory of the support structure material provided the support structure 18 has not been plastically deformed. In other words, when the piezoelectric device is discharged, the device shrinks or contracts along the one predetermined axis and the shape memory of the support structure material biases both the first and second arms 22 and 24 and the opposing surfaces 12 and 14 back toward the original shape of the apparatus 10a. The closing of the opposing surfaces 12 and 14 can be adjusted by controlling the discharge of the piezoelectric device. In this manner, the apparatus 10a is particularly adapted to function as a normally closed clamp.

Preferably, when the actuator 16 is activated, the apparatus 10a is designed such that the first web 26 remains planar while the second web 46 is driven toward a planar shape and only the portions of the first and second arms 22 and 24 between the reduced cross-sectional area portions 32 and the opposing surfaces 12 and 14 are driven apart. The non-planar second web 46 may be shaped as an angled web, as illustrated in FIG. 13, or as a bowed web. In FIG. 13, the first and second arms 22 and 24 include reduced cross-sectional area portions 32 approximately at a junction of the second web 46 and the respective arm 22 and 24 to facilitate the bending the first and second arms 22 and 24 when the actuator 16 is activated.

Figure 14:
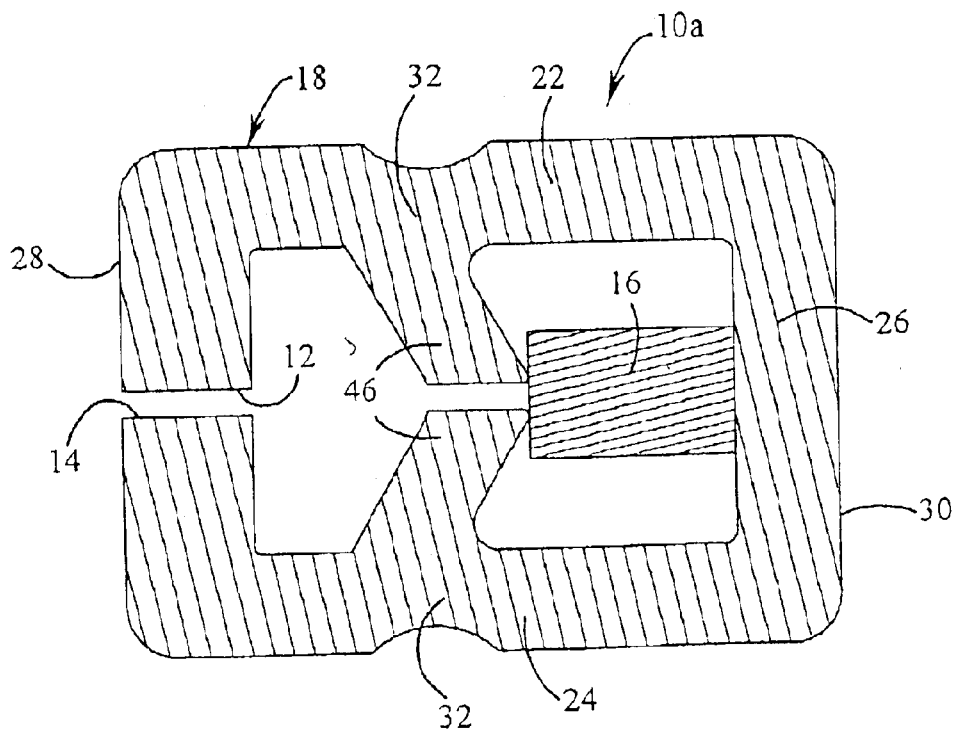
FIG. 14 is a cross-sectional view of the first embodiment of the apparatus with the support structure including a discontinuous second web.

FIG. 14 is a cross-sectional view of the first embodiment of the apparatus 10a with the support structure 18 including a discontinuous second web 46. The discontinuity of the second web reduces the amount of structural stress incurred upon the second web 46 when the actuator 16 is activated.

The discontinuity of the second web also increases the amount of separation between the opposing surfaces 12 and 14 when the actuator 16 is activated.

Figure 15:
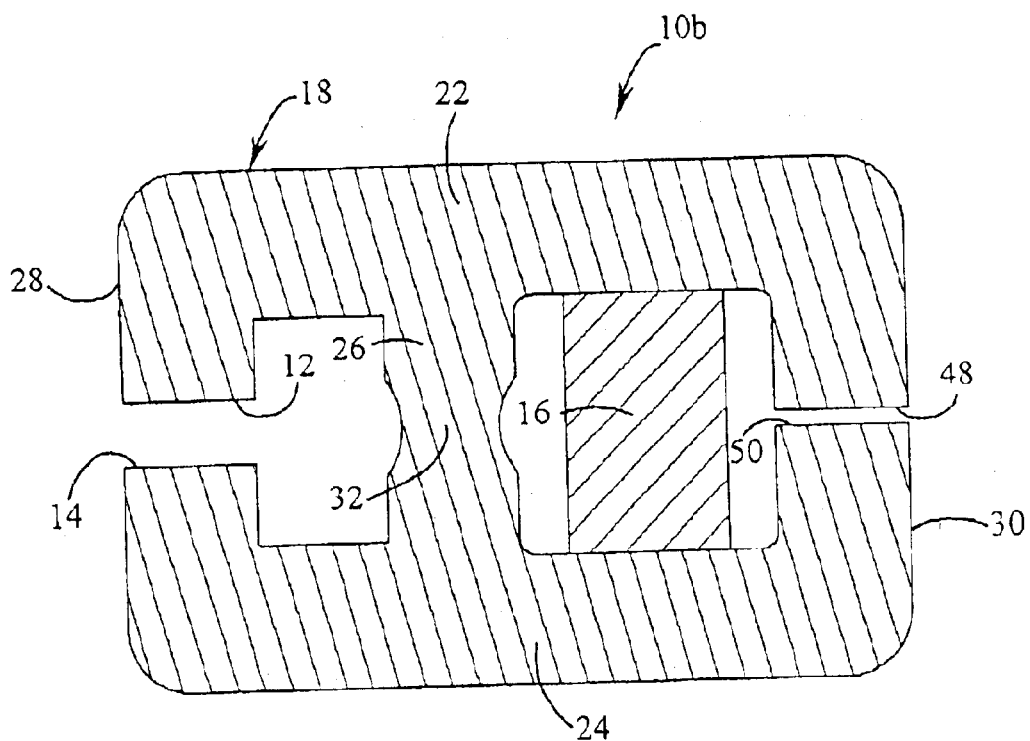
FIG. 15 is a cross-sectional view of the second embodiment of the apparatus including a second pair of opposing surfaces.

FIG. 15 is a cross-sectional view of the second embodiment of the apparatus 10b further including a second pair of opposing surfaces 48 and 50. The second pair of opposing surfaces 48 and 50 are formed on the support structure 18 for movement relative to one another. The actuator 16 is operably engaged to the support structure 18 for simultaneously driving both the first pair of opposing surfaces 12 and 14 relative to one another and the second pair of opposing surfaces 48 and 50 relative to one another in response to an electrical activation of the actuator 16. In this configuration of the apparatus 10b, the actuator 16 is disposed between the web 26 and the second pair of opposing surfaces 48 and 50.

In the second embodiment of the apparatus 10b, the second pair of opposing surfaces 48 and 50 can be disposed at the second end 30 of the first and second arms 22 and 24, as illustrated in FIG. 15, or between the actuator 16 and the second end 30. The actuator 16 is operably engaged between the first and second arms 22 and 24 for driving the first and second arms 22 and 24 in response to an electrical activation of the actuator 16. With the first pair of opposing surfaces 12 and 14 and the second pair of opposing surfaces 48 and 50 disposed on opposite sides of the web 26, the actuator 16 drives the first pair of opposing surfaces 12 and 14 in a first direction and the second pair of opposing surfaces 48 and 50 in a second direction opposite the first direction.

When the actuator 16 is deactivated, the first pair of opposing surfaces 12 and 14 are supported in a normally open position and the second pair of opposing surfaces 48 and 50 are supported in a normally closed position. Thus, when the actuator 16 is electrically activated, the second ends 30 of the first and second arms 22 and 24 are driven away or apart from one another and the first ends 28 of the first and second arms 22 and 24 are driven toward one another. In this manner, the space or distance between the first pair of opposing surfaces 12 and 14 is decreased and the space or distance between the second pair of opposing surfaces 48 and 50 is increased. In other words, when a voltage is applied across the piezoelectric device, the spatial displacement produced along the predetermined axis drives the second ends 30 of the first and second arms 22 and 24 away or apart from one another and driving the first ends 28 of the first and second arms 22 and 24 toward one another thus decreasing the distance or space between the first pair of opposing surfaces 12 and 14 and increasing the distance or space between the second pair of opposing surfaces 48 and 50. The closing of the first pair of opposing surfaces 12 and 14 and the opening of the second pair of opposing surfaces 48 and 50 can be adjusted by varying the amount of voltage applied across the piezoelectric device. Thus, the distance between the first pair of opposing surfaces 12 and 14 and the second pair of opposing surfaces 48 and 50 is a function of the amount of expansion along the axis of displacement relative to the voltage applied, the position of the actuator 16 relative to the web 26, the length of the first and second arms 22 and 24, the geometry and location of the reduced cross-sectional area portion 32, and the modulus of elasticity of the support structure material.

When the actuator 16 is deactivated, the second pair of opposing surfaces 48 and 50 are biased toward one another and the first pair of opposing surfaces 12 and 14 are biased away or apart from one another by the shape memory of the support structure material provided the support structure 18 has not been plastically deformed. In other words, when the piezoelectric device is discharged, the device shrinks or contracts along the one predetermined axis and the shape memory of the support structure material biases the first and second arms 22 and 24, the first pair of opposing surfaces 12 and 14, and the second pair of opposing surfaces 48 and 50 back toward the original I-shape of the apparatus 10b. The opening of the first pair of opposing surfaces 12 and 14 and the closing of the second pair of opposing surfaces 48 and 50 can be adjusted by controlling the discharge of the piezoelectric device. In this manner, the apparatus 10b is particularly adapted to function as a mechanism having one pair of normally open jaws and one pair of normally closed jaws.

To facilitate the motion of the first and second arms 22 and 24, the web 26 can include a reduced cross-sectional area portion 32 for establishing a flex axis.

In an alternative embodiment of the apparatus 10b, the second pair of opposing surfaces 48 and 50 can be disposed between the first pair of opposing surfaces 12 and 14 and the first web 26. With the first pair of opposing surfaces 12 and 14 and the second pair of opposing surfaces 48 and 50 disposed on the same side of the web 26, the actuator 16 simultaneously drives both the first pair of opposing surfaces 12 and 14 and the second pair of opposing surfaces 48 and 50 in the same direction. In this manner, the apparatus 10b is particularly adapted to function as a dual clamp having two pairs of normally open jaws.

Within the scope of the present invention, the first embodiment of the apparatus 10a, as illustrated in FIG. 2, can also include a second pair of opposing surfaces 48 and 50 disposed between the first pair of opposing surfaces 12 and 14 the first web 26. In this manner, the first embodiment of the apparatus 10a is particularly adapted to function as a dual clamp having two pairs of normally closed jaws.

Figure 16:
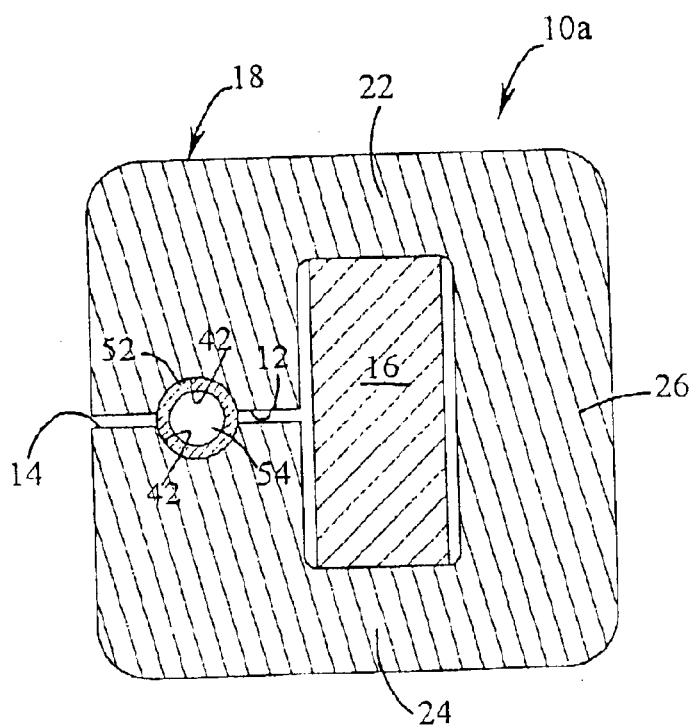
FIG. 16 is a cross-sectional view of the first embodiment of the apparatus with at least one of the pair of opposing surfaces including a shaped recess complementary with respect to a flexible article to be engaged therebetween.

FIG. 16 is a cross-sectional view of the first embodiment of the apparatus 10a with at least one of the pair of opposing surfaces 12 or 14 including a shaped recess 42 complementary with respect to a flexible article 52 to be engaged between the opposing surfaces 12 and 14. The flexible article 52 has a fluid flow passageway 54 extending therethrough. The opening and closing of the opposing surfaces 12 and 14 causes a change in a cross-sectional area of the fluid flow passageway 54 when the actuator 16 is electrically activated and deactivated respectively.

The opposing surfaces 12 and 14 are normally immediately or nearly adjacent to one another. As a result, the cross-sectional area of the fluid flow passageway 54 is normally relatively small or zero. In other words, the fluid flow passageway 54 is normally significantly restricted or completely closed.

When the actuator 16 is electrically activated, the first and second arms 22 and 24 are driven away or apart from one another as illustrated in FIG. 16. In this manner, the space or distance between the opposing surfaces 12 and 14 is increased enlarging the cross-sectional area of the fluid flow passageway 54. In other words, when a voltage is applied across the piezoelectric device, the spatial displacement produced along the predetermined axis drives the first and second arms 22 and 24 away or apart from one another increasing the space or distance between the opposing surfaces 12 and 14 and opening the fluid flow passageway 54. The opening of the passageway 54 can be adjusted by varying the amount of voltage applied across the piezoelectric device.

When the actuator 16 is deactivated, the opposing surfaces 12 and 14 are biased toward one another by the shape memory of the support structure material provided the support structure 18 has not been plastically deformed. As a result, the cross-sectional area of the fluid flow passageway 54 is reduced back towards the initial zero or relatively small size. In other words, when the piezoelectric device is discharged, the device shrinks or contracts along the one predetermined axis and the shape memory of the support structure material biases the first and second arms 22 and 24 and the opposing surfaces 12 and 14 back toward the original C-shape of the apparatus 10a. As a result, the fluid flow passageway 54 is significantly restricted or completely closed. The closing of the passageway 54 can be adjusted by controlling the discharge of the piezoelectric device. In this manner, the first embodiment of the apparatus 10a is particularly adapted to function as a pinch valve.

Figure 17:
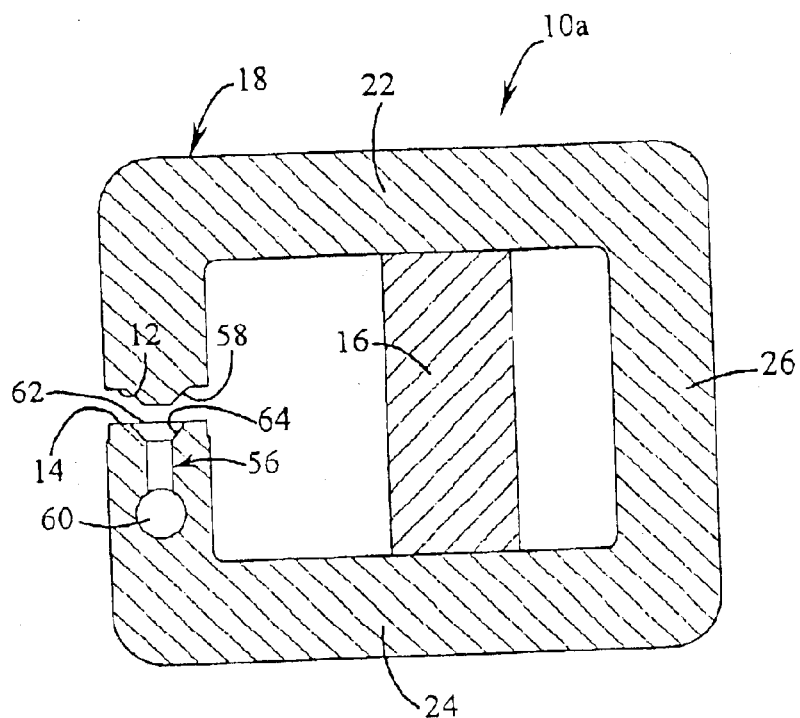
FIG. 17 is a cross-sectional view of the first embodiment of the apparatus with the support structure including a first type of fluid flow passageway and a first type of valve surface.

FIG. 17 is a cross-sectional view of the first embodiment of the apparatus 10a with the support structure 18 including a fluid flow passageway 56 and a valve surface 58. The fluid flow passageway 56 extends through at least a portion of the support structure 18 and defines an inlet 60, an outlet 62, and a valve seat 64 disposed within the passageway 56 and positioned with respect to one opposing surface 14. The valve surface 58 is supported with respect to the other opposing surface 12 for regulating fluid flow through the passageway 56 at the valve seat 64 in response to an electrical activation of the actuator 16. In this embodiment of the first apparatus 10a, the valve seat 64 is disposed immediately adjacent to the one opposing surface 14 and the valve surface 58 is supported to extend from the other opposing surface 12 in alignment with the valve seat 64.

The opposing surfaces 12 and 14 are normally immediately adjacent to one another or, in other words, closed. As a result, the valve surface 58 is normally sealingly engaged with the valve seat 64. In other words, fluid flow through the passageway 56 at the valve seat 64 is normally significantly restricted or completely blocked. In this manner, the apparatus 10a operates as a normally closed valve.

When the actuator 16 is electrically activated, the first and second arms 22 and 24 are driven away or apart from one another as illustrated in FIG. 17. In this manner, the space or distance between the opposing surfaces 12 and 14 is increased separating the valve surface 58 from the valve seat 64 of the passageway 56. In other words, when a voltage is applied across the piezoelectric device, the spatial displacement produced along the predetermined axis drives the first and second arms 22 and 24 away or apart from one another increasing the space or distance between the opposing surfaces 12 and 14 and allowing fluid flow through the passageway 56 at the valve seat 64. The opening of the passageway 56 at the valve seat 64 can be adjusted by varying the amount of voltage applied across the piezoelectric device.

When the actuator 16 is deactivated, the opposing surfaces 12 and 14 are biased toward one another by the shape memory of the support structure material provided the support structure 18 has not been plastically deformed. As a result, the valve surface 58 and the valve seat 64 of the passageway 56 are biased back toward each other. In other words, when the piezoelectric device is discharged, the device shrinks or contracts along the one predetermined axis and the shape memory of the support structure material biases the first and second arms 22 and 24 and the opposing surfaces 12 and 14 back toward the original C-shape of the apparatus 10a. As a result, fluid flow through the passageway 56 at the valve seat 64 is restricted or completely blocked. The closing of the passageway 56 can be adjusted by controlling the discharge of the piezoelectric device. In this manner, the first embodiment of the apparatus 10a is particularly adapted to function as one of several types of valves, such as a needle valve, or face seal valve.

Within the scope of the present invention, the second embodiment of the apparatus 10b, as illustrated in FIG. 4, can also include a fluid flow passageway 56 and a valve surface 58 configured similar to the first embodiment of the apparatus 10a as described above. In this manner, the second embodiment of the apparatus 10b is particularly adapted to function as one of several types of valves, such as a needle valve, or face seal valve. In the second embodiment of the apparatus 10b, the valve surface 58 is normally spaced from the valve seat 64 and, therefore, the apparatus 10b operates as a normally open valve.

FIG. 18 is a cross-sectional view of the first embodiment of the apparatus 10a with the support structure 18 including a fluid flow passageway 56 and a valve surface 58. The fluid flow passageway 56 extends through at least a portion of the support structure 18 and defines an inlet 60, an outlet 62, and a valve seat 64 disposed within the passageway 56 and positioned with respect to one opposing surface 14. The valve surface 58 is supported with respect to the other opposing surface 12 for regulating fluid flow through the passageway 56 at the valve seat 64 in response to an electrical activation of the actuator 16. In this embodiment of the first apparatus 10a, the valve surface 58 is supported to extend from the other opposing surface 12, the valve seat 64 is spaced from the one opposing surface 14, and the passageway 56 further includes a valve surface passage 66 extending between the one opposing surface 14 and the valve seat 64 in alignment with the valve surface 58.

The opposing surfaces 12 and 14 are normally immediately or nearly adjacent to one another or, in other words, closed. As a result, the valve surface 58 is normally sealingly engaged with the valve seat 64. In other words, fluid flow through the passageway 56 at the valve seat 64 is normally significantly restricted or completely blocked. In this manner, the apparatus 10a operates as a normally closed clamp.

When the actuator 16 is electrically activated, the first and second arms 22 and 24 are driven away or apart from one another as illustrated in FIG. 18. In this manner, the space or distance between the opposing surfaces 12 and 14 is increased separating the valve surface 58 from the valve seat 64 of the passageway 56. In other words, when a voltage is applied across the piezoelectric device, the spatial displacement produced along the predetermined axis drives the first and second arms 22 and 24 away or apart from one another increasing the space or distance between the opposing surfaces 12 and 14 and allowing fluid flow through the passageway 56 at the valve seat 64. The opening of the passageway 56 at the valve seat 64 can be adjusted by varying the amount of voltage applied across the piezoelectric device.

When the actuator 16 is deactivated, the opposing surfaces 12 and 14 are biased toward one another by the shape memory of the support structure material provided the support structure 18 has not been plastically deformed. As a result, the valve surface 58 and the valve seat 64 of the passageway 56 are biased back toward each other. In other words, when the piezoelectric device is discharged, the device shrinks or contracts along the one predetermined axis and the shape memory of the support structure material biases the first and second arms 22 and 24 and the opposing surfaces 12 and 14 back toward the original C-shape of the apparatus 10a. As a result, fluid flow through the passageway 56 at the valve seat 64 is restricted or completely blocked. The closing of the passageway 56 can be adjusted by controlling the discharge of the piezoelectric device. In this manner, the first embodiment of the apparatus 10a is particularly adapted to function as one of several types of valves, such as a needle valve, or face seal valve.

Within the scope of the present invention, the second embodiment of the apparatus 10b, as illustrated in FIG. 4, may also include a fluid flow passageway 56 and a valve surface 58 configured similar to the first embodiment of the apparatus 10a as described above. In this manner, the second embodiment of the apparatus 10b is particularly adapted to function as one of several types of valves, such as a needle valve, or face seal valve. In the second embodiment of the apparatus 10b, the valve surface 58 is normally spaced from the valve seat 64 and, therefore, the apparatus 10b operates as a normally open valve.

Figure 19:
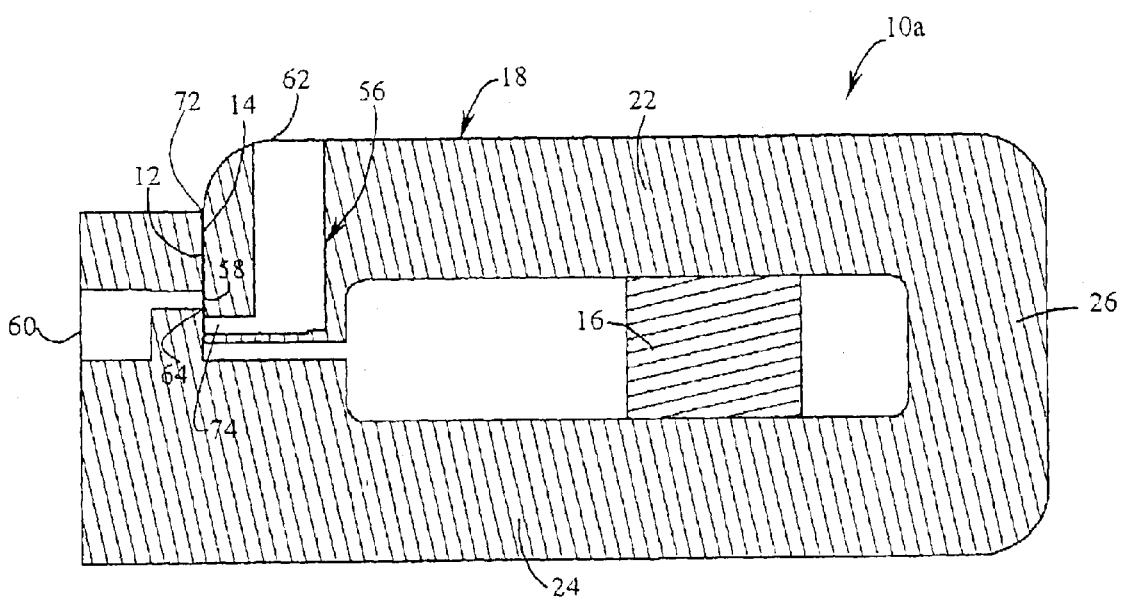
FIG. 19 is a cross-sectional view of the first embodiment of the apparatus with the support structure including a third type of fluid flow passageway and a third type of valve surface.

FIG. 19 is a cross-sectional view of the first embodiment of the apparatus 10a with the support structure 18 including a fluid flow passageway 56 and a valve surface 58. The fluid flow passageway 56 extends through at least a portion of the support structure 18 and defines an inlet 60, an outlet 62, and a valve seat 64 disposed within the passageway 56 and positioned with respect to one opposing surface 12. The valve surface 58 is supported with respect to the other opposing surface 14 for regulating fluid flow through the passageway 56 at the valve seat 64 in response to an electrical activation of the actuator 16. In this embodiment of the first apparatus 10a, the pair of opposing surfaces 12 and 14 are operably disposed in sliding contact with one another along a parting line 72 defined therebetween, the valve seat 64 is disposed at the one opposing surface 12, and the valve surface 58 is disposed at the other opposing surface 14.

The valve surface 58 is normally aligned with respect to the valve seat 64 as illustrated in FIG. 19. As a result, the valve surface 58 is normally sealingly engaged with the valve seat 64. In other words, fluid flow through the passageway 56 at the valve seat 64 is normally significantly restricted or completely blocked.

When the actuator 16 is electrically activated, the first and second arms 22 and 24 are driven away or apart from one another. In this manner, the opposing surfaces 12 and 14 are moved or slid in opposite directions aligning the valve seat 64 and a complementary portion 74 of the passageway 56. In other words, when a voltage is applied across the piezoelectric device, the spatial displacement produced along the predetermined axis drives the first and second arms 22 and 24 away or apart from one another aligning the valve seat 64 and the complementary portion 74 of the passageway 56 and allowing fluid flow through the passageway 56 at the valve seat 64. The opening of the passageway 56 at the valve seat 64 can be adjusted by varying the amount of voltage applied across the piezoelectric device.

When the actuator 16 is deactivated, both the first and second arms 22 and 24 are biased toward one another by the shape memory of the support structure material provided the support structure 18 has not been plastically deformed. As a result, the valve surface 58 and the valve seat 64 of the passageway 56 are biased back toward alignment with each other. In other words, when the piezoelectric device is discharged, the device shrinks or contracts along the one predetermined axis and the shape memory of the support structure material biases the first and second arms 22 and 24 back toward the original C-shape of the apparatus 10a. As a result, fluid flow through the passageway 56 at the valve seat 64 is restricted or completely blocked. The closing of the passageway 56 can be adjusted by controlling the discharge of the piezoelectric device. In this manner, the first embodiment of the apparatus 10a is particularly adapted to function as a gate valve.

Within the scope of the present invention, the embodiments of the apparatus 10a illustrated in FIGS. 18 and 19 may be operated as a valve to restrict fluid flow in the passageway from the inlet to the outlet or restrict fluid flow in the passageway from the outlet to the inlet.

All of the embodiments of the present invention described above have been illustrated in an open or closed position. However, with appropriate electronic control via the controller 20, each embodiment can be partially opened and/or partially closed. Such control can be coordinated relative to desired set points using sensors and electronics which receive inputs from the sensors, compare the inputs to the desired set points, and adjust the opposing surfaces accordingly.

The overall size (height (H)×width (W)×depth (D)) of the present invention will nominally range between 0.25 inches by 0.25 inches by 0.25 inches to 3 inches by 2 inches by 1 inch inclusive. However, depending on the application of the present invention, the size of the apparatus may be larger or smaller than such nominal range.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus comprising:
    at least one pair of opposing surfaces formed on a support structure for movement relative to one another;
    an actuator operably engaging the support structure for driving the at least one pair of opposing surfaces relative to one another in response to an electrical activation of the actuator;
    at least one fluid flow passageway extending through at least a portion of the support structure and defining an inlet, an outlet, and a valve seat disposed within the passageway and positioned with respect to one of the at least one pair of opposing surfaces; and
    a valve surface supported with respect to the other of the at least one pair of opposing surfaces for regulating fluid flow through the at least one passageway at the valve seat in response to an electrical activation of the actuator.

2. The apparatus of claim 1 wherein the actuator is a piezoelectric device.

3. The apparatus of claim 1 wherein the actuator drives the at least one pair of opposing surfaces toward one another in response to an electrical activation of the actuator.

4. The apparatus of claim 1 wherein the actuator drives the at least one pair of opposing surfaces apart from one another in response to an electrical activation of the actuator.

5. The apparatus of claim 1 wherein the support structure further comprises:
    first and second arms, each arm having one of the at least one pair of opposing surfaces disposed at a first end; and
    at least one web extending between the first and second arms.

6. The apparatus of claim 5 wherein the at least one web extends between the first and second arms at a second end opposite the first end.

7. The apparatus of claim 5 wherein the actuator is operably engaged between the first and second arms for driving the first and second arms in response to an electrical activation of the actuator.

8. The apparatus of claim 7 wherein the actuator is disposed between the first end of the first and second arms and the at least one web.

9. The apparatus of claim 5 wherein the at least one web extends between the first and second arms at a position intermediate with respect to the first end and a second end opposite the first end.

10. The apparatus of claim 8 wherein the actuator is operably engaged between the first and second arms for driving the first and second arms in response to an electrical activation of the actuator.

11. The apparatus of claim 9 wherein the actuator is disposed between the at least one web and the second end of the first and second arms.

12. The apparatus of claim 5 wherein at least one of the first arm, the second arm, and the at least one web includes a flex axis.

13. The apparatus of claim 12 wherein the flex axis is established with one of a reduced cross-sectional area portion and a materially modified portion.

14. The apparatus of claim 13 wherein the flex axis is located at a junction between the at least one web and the respective arm.

15. The apparatus of claim 13 wherein the flex axis is located along the respective arm between the actuator and the at least one web.

16. The apparatus of claim 1 wherein each surface of the at least one pair of opposing surfaces includes a shaped recess complementary with respect to an article to be engaged therebetween.

17. The apparatus of claim 1 wherein each surface of the at least one pair of opposing surfaces includes an article-engaging portion composed of a material selected for one or more predetermined characteristics.

18. The apparatus of claim 1 wherein each surface of the at least one pair of opposing surfaces includes an article-engaging portion composed of a material selected to establish a coefficient of friction between an article to be engaged and the article-engaging portion.

19. The apparatus of claim 1 wherein each surface of the at least one pair of opposing surfaces includes an article-engaging portion composed of a material selected to conform to a shape of an article to be engaged therebetween.

20. The apparatus of claim 1 wherein each surface of the at least one pair of opposing surfaces includes a replaceable article-engaging portion.

21. The apparatus of claim 5 further comprising:
the at least one pair of opposing surfaces including a first pair of opposing surfaces formed on the support structure at the first end of the first and second arms for movement relative to one another, and a second pair of opposing surfaces formed on the support structure for movement relative to one another; and
the actuator operably engaging the support structure for driving the first pair of opposing surfaces relative to one another and the second pair of opposing surfaces relative to one another in response to an electrical activation of the actuator.

22. The apparatus of claim 21 wherein each of the first and second arms has one of the second pair of opposing surfaces disposed at a second end opposite the first end.

23. An apparatus comprising:
at least one pair of opposing surfaces formed on a support structure for movement relative to one another, wherein the support structure includes first and second arms, each arm having one of the at least one pair of opposing surfaces disposed at a first end, and at least one web extending between the first and second arms, the at least one pair of opposing surfaces including a first pair of opposing surfaces formed on the support structure at the first end of the first and second arms for movement relative to one another, and a second pair of opposing surfaces formed on the support structure for movement relative to one another; and
an actuator operably engaging the support structure for driving the at least one pair of opposing surfaces relative to one another in response to an electrical activation of the actuator, the actuator operably engaging the support structure for driving the first pair of opposing surfaces relative to one another and the second pair of opposing surfaces relative to one another in response to an electrical activation of the actuator, wherein the actuator drives the first pair of opposing surfaces in a first direction and the second pair of opposing surfaces in a second direction opposite the first direction.

24. The apparatus of claim 21 wherein the actuator is operably engaged between the first and second arms for driving the first and second arms in response to an electrical activation of the actuator.

25. The apparatus of claim 24 wherein the actuator is disposed between the at least one web and one of the first and second ends of the first and second arms.

26. The apparatus of claim 5 further comprising:
the at least one web including a first web extending between the first and second arms spaced from the first end, and a second web extending between the first and second arms at a position intermediate with respect to the first end and the first web; and
the actuator operably engaged between the first and second webs to drive the first and second webs apart in response to an electrical activation of the actuator.

27. The apparatus of claim 26 wherein the first web extends between the first and second arms at a second end opposite the first end.

28. The apparatus of claim 27 wherein the second web is shaped with respect to the first web and the first and second arms such that the first and second arms are driven with respect to one another in response to an electrical activation of the actuator.

29. The apparatus of claim 28 wherein the second web is non-planar.

30. An apparatus comprising:
at least one pair of opposing surfaces formed on a support structure for movement relative to one another, the support structure including first and second arms, each arm having one of the at least one pair of opposing surfaces disposed at a first end, and at least one web extending between the first and second arms, the at least one web including a first web extending between the first and second arms spaced from the first end, and a second web extending between the first and second arms at a position intermediate with respect to the first end and the first web, the first web extending between the first and second arms at a second end opposite the first end, wherein the second web is discontinuous; and
an actuator operably engaging the support structure for driving the at least one pair of opposing surfaces relative to one another in response to an electrical activation of the actuator, the actuator operably engaged between the first and second webs to drive the first and second webs apart in response to an electrical activation of the actuator, the second web shaped with respect to the first web and the first and second arms such that the first and second arms are driven with respect to one another in response to an electrical activation of the actuator.

31. The apparatus of claim 28 wherein at least one of the first and second arms includes a flex axis at a junction of the second web and the respective arm.

32. The apparatus of claim 1 wherein at least one surface of the at least one pair of opposing surfaces includes a shaped recess complementary with respect to a flexible article having a passageway extending therethrough to be engaged between the at least one pair of opposing surfaces.

33. The apparatus of claim 32 wherein driving the opposing surfaces causes a change in a cross-sectional area of the passageway of the flexible article.

34. The apparatus of claim 1 wherein the valve surface sealingly engages the valve seat in response to an electrical activation of the actuator.

35. The apparatus of claim 1 wherein the valve surface is spaced from the valve seat in response to an electrical activation of the actuator.

36. The apparatus of claim 1 wherein the valve seat is disposed immediately adjacent to the one of the at least one pair of opposing surfaces and the valve surface is supported to extend from the other of the at least one pair of opposing surfaces in alignment with the valve seat.

37. The apparatus of claim 1 wherein the valve seat is spaced from the one of the at least one pair of opposing surfaces and the passageway further includes a valve surface passage extending between the one of the at least one pair of opposing surfaces and the valve seat in alignment with the valve surface.

38. The apparatus of claim 1 wherein the at least one pair of opposing surfaces are operably disposed in sliding contact with one another along a parting line defined therebetween, the valve seat is disposed at the one of the at least one pair of opposing surfaces, and the valve surface is disposed at the other of the at least one pair of opposing surfaces.

39. An apparatus comprising:

first and second pairs of opposing surfaces formed on a support structure for movement relative to one another, wherein the support structure includes first and second arms, each arm having a first end and a second end, and a web extending between the first and second arms intermediate the first and second ends; and an actuator operably engaging the support structure for driving the at least one pair of opposing surfaces relative to one another in response to an electrical activation of the actuator, wherein the actuator drives the first pair of opposing surfaces in a first direction and simultaneously drives the second pair of opposing surfaces in a second direction opposite the first direction.

40. An apparatus comprising:

at least one pair of opposing surfaces formed on a support structure for movement relative to one another, the support structure including first and second arms, each arm having a first end and a second end, a first web extending between the first and second arms adjacent one end, and a second web extending between the first and second arms at a position intermediate the first end and the second end, wherein the second web is discontinuous; and an actuator operably engaging the support structure for driving the at least one pair of opposing surfaces relative to one another in response to an electrical activation of the actuator, the actuator operably engaged between the first and second webs to drive the first and second webs apart in response to an electrical activation of the actuator, the second web shaped with respect to the first web and the first and second arms such that the first and second arms are driven with respect to one another in response to an electrical activation of the actuator.

41. The apparatus of claim 1, wherein the support structure defines a needle valve configuration operable in response to electrical activation of the actuator.

42. The apparatus of claim 1, wherein the support structure defines a slide valve configuration operable in response to the electrical activation of the actuator.

43. The apparatus of claim 1, wherein the support structure defines a compression valve configuration operable in response to the electrical activation of the actuator.

* * * * *